(12) United States Patent
Ushigome et al.

(10) Patent No.: US 10,710,284 B2
(45) Date of Patent: *Jul. 14, 2020

(54) EXPANSION DEVICE AND MOLDING SYSTEM

(71) Applicant: CASIO COMPUTER CO., LTD., Shibuya-ku, Tokyo (JP)

(72) Inventors: Youichi Ushigome, Akishima (JP); Minoru Saito, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 285 days.

This patent is subject to a terminal disclaimer.

(21) Appl. No.: 15/895,433

(22) Filed: Feb. 13, 2018

(65) Prior Publication Data

US 2018/0272578 A1 Sep. 27, 2018

(30) Foreign Application Priority Data

Mar. 24, 2017 (JP) .................. 2017-060037

(51) Int. Cl.
*B29C 44/34* (2006.01)
*B41M 5/00* (2006.01)
(Continued)

(52) U.S. Cl.
CPC .......... *B29C 44/353* (2013.01); *B29C 44/022* (2013.01); *B32B 5/02* (2013.01); *B32B 27/08* (2013.01); *B32B 27/10* (2013.01); *B32B 27/12* (2013.01); *B32B 27/18* (2013.01); *B32B 27/306* (2013.01); *B32B 27/32* (2013.01); *B32B 27/36* (2013.01); *B32B 29/002* (2013.01); *B41J 2/2107* (2013.01); *B41J 11/002* (2013.01); *B41M 5/0047* (2013.01);
(Continued)

(58) Field of Classification Search
CPC . B29C 44/353; B29C 44/3415; B29C 44/022; B29C 2035/0827
USPC ..................... 219/216, 385, 521; 425/174.4
See application file for complete search history.

(56) References Cited

U.S. PATENT DOCUMENTS 3,187,162 A * 6/1965 Hojo .................. G03G 15/2003
219/388
6,620,495 B1 9/2003 Kobayashi et al.
(Continued)

FOREIGN PATENT DOCUMENTS

CN 104540675 A 4/2015
JP 56155786 A 12/1981
(Continued)

*Primary Examiner* — Robert B Davis
(74) *Attorney, Agent, or Firm* — Holtz, Holtz & Volek PC

(57) ABSTRACT

An expansion device, including: an irradiation unit configured to irradiate the thermally expandable sheet placed on a placing unit with light; a conveyance unit configured to reciprocably convey the irradiation unit between a first position and a second position; an exhaust fan fixed to a housing and configured to discharge air from the housing; and an air supply fan which is movable with the irradiation unit and configured to supply outside air into the housing, wherein the exhaust fan is provided at a position where air can be discharged from the second position side when the irradiation unit is returned from the first position to the second position after being moved from the second position toward the first position.

19 Claims, 16 Drawing Sheets

(51) Int. Cl.

| | | |
|---|---|---|
| *B41M 7/00* | (2006.01) | |
| *B41J 2/21* | (2006.01) | |
| *B41J 11/00* | (2006.01) | |
| *B32B 29/00* | (2006.01) | |
| *B32B 5/02* | (2006.01) | |
| *B32B 27/32* | (2006.01) | |
| *B32B 27/36* | (2006.01) | |
| *B32B 27/30* | (2006.01) | |
| *B32B 27/18* | (2006.01) | |
| *B32B 27/12* | (2006.01) | |
| *B32B 27/10* | (2006.01) | |
| *B32B 27/08* | (2006.01) | |
| *B29C 44/02* | (2006.01) | |
| *B41M 5/50* | (2006.01) | |
| *B29K 31/00* | (2006.01) | |
| *B29K 105/00* | (2006.01) | |
| *B29K 667/00* | (2006.01) | |
| *B41M 3/00* | (2006.01) | |
| *B29C 35/16* | (2006.01) | |
| *B29L 9/00* | (2006.01) | |
| *B29K 711/12* | (2006.01) | |
| *B29K 623/00* | (2006.01) | |
| *B29C 44/60* | (2006.01) | |

(52) U.S. Cl.
CPC .......... *B41M 5/0064* (2013.01); *B41M 5/506* (2013.01); *B41M 7/009* (2013.01); *B41M 7/0081* (2013.01); *B29C 44/3415* (2013.01); *B29C 44/60* (2013.01); *B29C 2035/1666* (2013.01); *B29C 2795/002* (2013.01); *B29K 2031/04* (2013.01); *B29K 2105/0076* (2013.01); *B29K 2623/12* (2013.01); *B29K 2667/003* (2013.01); *B29K 2667/006* (2013.01); *B29K 2711/12* (2013.01); *B29L 2009/00* (2013.01); *B32B 2255/20* (2013.01); *B32B 2554/00* (2013.01); *B41M 3/00* (2013.01)

(56) References Cited

U.S. PATENT DOCUMENTS

| | | |
|---|---|---|
| 9,731,494 B2 | 8/2017 | Yamasaki |
| 10,016,965 B2 | 7/2018 | Sugimoto |
| 2003/0235635 A1* | 12/2003 | Fong ................ B08B 15/02 425/73 |
| 2015/0246518 A1 | 9/2015 | Sugimoto |
| 2015/0375546 A1 | 12/2015 | Yamasaki |
| 2016/0075083 A1 | 3/2016 | Motoyanagi |
| 2018/0272777 A1* | 9/2018 | Ushigome ........ B29C 35/0805 |
| 2018/0361634 A1* | 12/2018 | Ushigome ........ B29C 44/3415 |

FOREIGN PATENT DOCUMENTS

| | | |
|---|---|---|
| JP | S61072589 A | 4/1986 |
| JP | 64028660 A | 1/1989 |
| JP | S6428660 A | 1/1989 |
| JP | 04166331 A | 6/1992 |
| JP | 07246767 A | 9/1995 |
| JP | H09175099 A | 7/1997 |
| JP | 2001150812 A | 6/2001 |
| JP | 2001225543 A | 8/2001 |
| JP | 2015230838 A | 12/2015 |
| JP | 2016010955 A | 1/2016 |

* cited by examiner

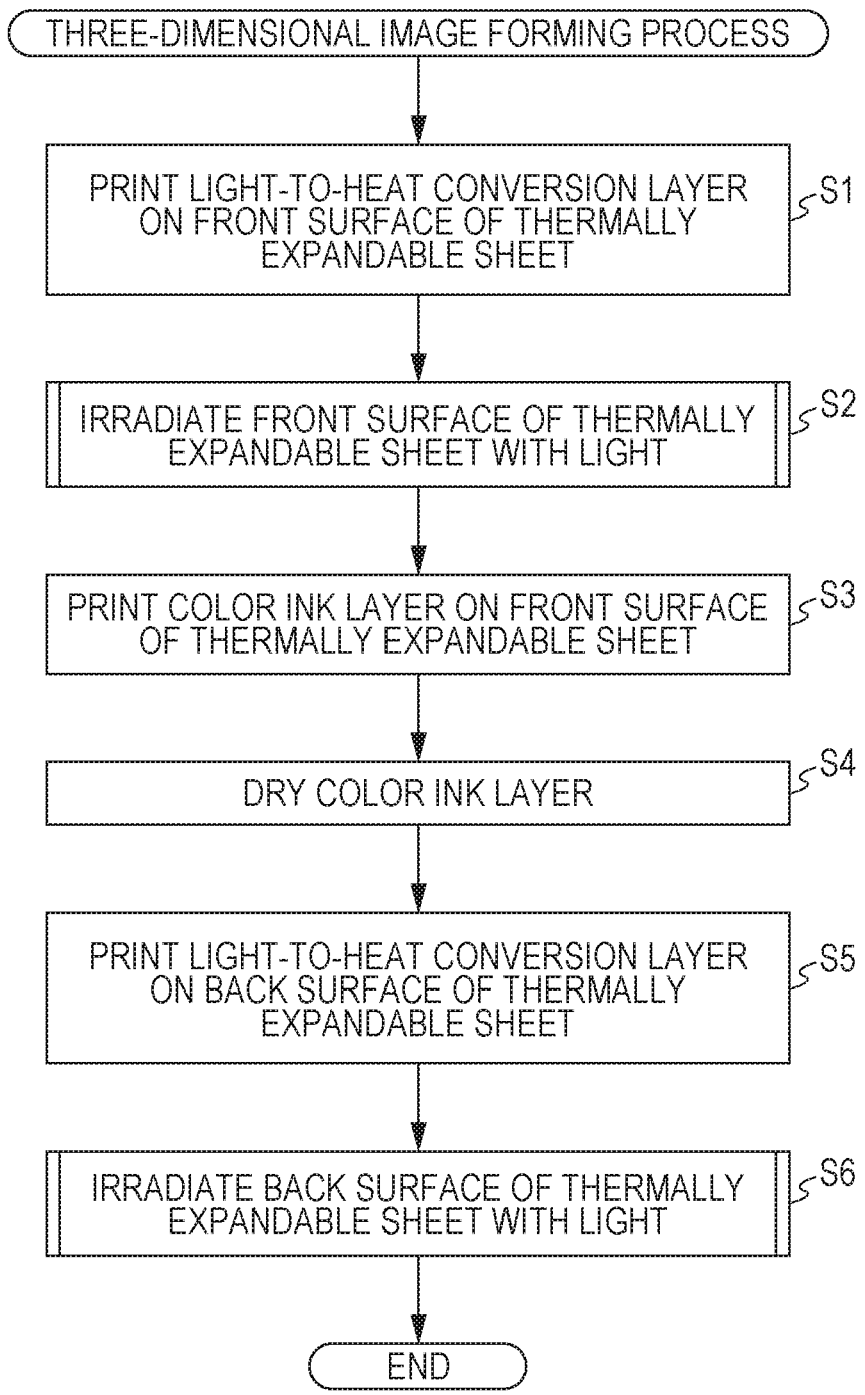

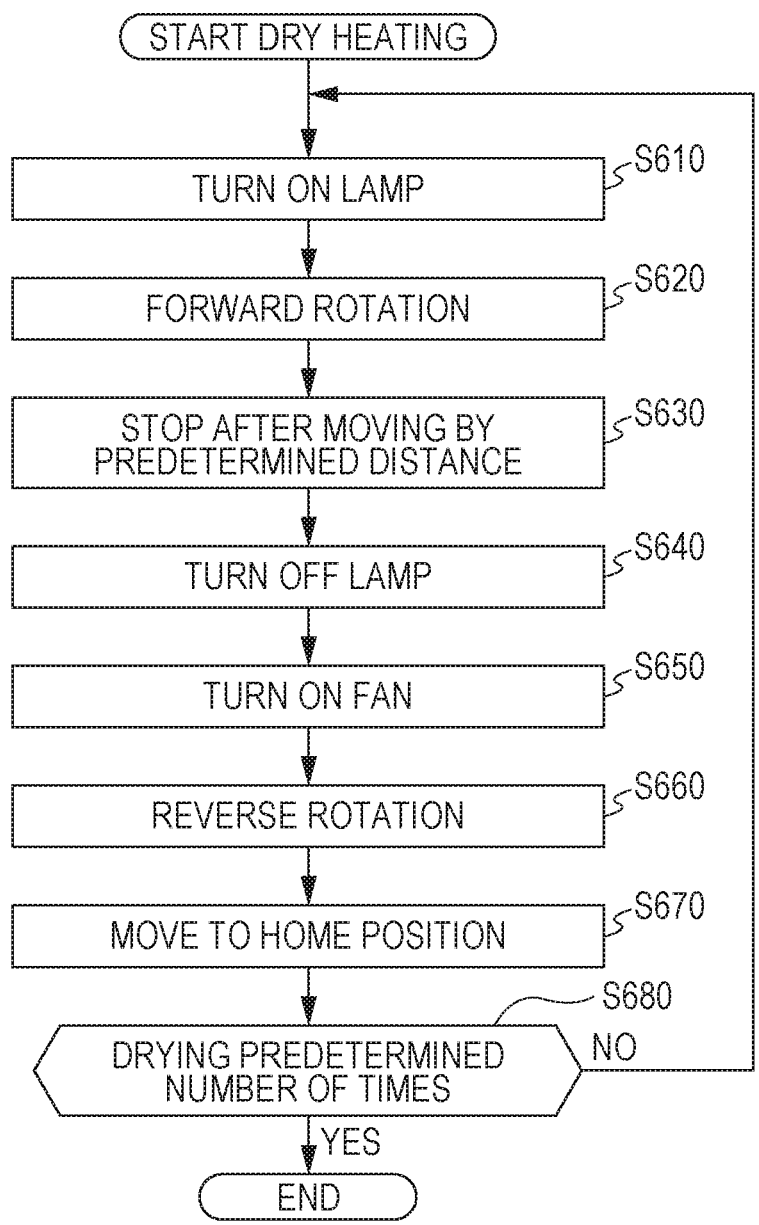

EXPANSION DEVICE AND MOLDING SYSTEM

BACKGROUND OF THE INVENTION

1. Field of the Invention

The present invention relates to an expansion device and a molding system.

2. Description of the Related Art

A technique for forming a three-dimensional image is known. For example, JP S64-28660 A and JP 2001-150812 A disclose methods of forming a three-dimensional image using a thermally expandable sheet. Specifically, in the methods disclosed in JP S64-28660 A and JP 2001-150812 A, a pattern is formed on a back surface of a thermally expandable sheet with a material having excellent light absorption characteristics, and the formed pattern is heated by being irradiated with light. As a result, the portion of the thermally expandable sheet on which the pattern is formed expands and swells to form a three-dimensional image.

Desirably, an expansion process for a thermally expandable sheet is performed in a space closed as much as possible against foreign matter like dust entering an apparatus from the outside, wind of the outside air flowing into the apparatus, and the like. Consequently, it is prevented that a surface of the thermally expandable sheet does not reach a desired temperature, and the expansion process is not satisfactorily performed due to influence from outside of the apparatus. However, in the expansion device disclosed in JP S64-28660 A and JP 2001-150812 A, a thermally expandable sheet is inserted from a guide plate on the side of a housing and conveyed in an apparatus, an expansion process is performed, and then the thermally expandable sheet is discharged from the guide plate on the opposite side. Therefore, it is difficult to form a closed space during the expansion process.

Further, a thermally expandable sheet may be deformed by heat in the case of being expanded by heating. When the thermally expandable sheet is deformed, a three-dimensional image formed on a front surface of the thermally expandable sheet is also distorted. Therefore, it becomes difficult to obtain a desired three-dimensional image. Therefore, to suppress the deformation of the thermally expandable sheet, it is desirable to efficiently cool the thermally expandable sheet after the expansion process. Particularly, when heating the thermally expandable sheet in the closed space, the space is filled with heat and therefore efficient cooling is desired. However, JP S64-28660 A and JP 2001-150812 A do not disclose a structure for cooling the thermally expandable sheet.

An object of the present invention is to provide an expansion device capable of efficiently cooling a thermally expandable sheet in a closed space.

SUMMARY OF THE INVENTION

An expansion device, including: an irradiation unit configured to irradiate the thermally expandable sheet placed on a placing unit with light; a conveyance unit configured to reciprocably convey the irradiation unit between a first position and a second position; an exhaust fan fixed to a housing and configured to discharge air from the housing; and an air supply fan which is movable with the irradiation unit and configured to supply outside air into the housing, wherein the exhaust fan is provided at a position where air can be discharged from the second position side when the irradiation unit is returned from the first position to the second position after being moved from the second position toward the first position.

An expansion device, including: an irradiation unit configured to irradiate the thermally expandable sheet placed on a placing unit with an electromagnetic wave; a conveyance unit configured to reciprocably convey the irradiation unit between a first position and a second position; an exhaust fan fixed to a housing and configured to discharge air from the housing; and an air supply fan movable together with the irradiation unit and configured to supply outside air in the housing, wherein the housings includes, on the first position side, an opening for a user to carry in and out the thermally expandable sheet, and the exhaust fan is provided on the second position side in the housing.

A molding system includes: a printing device configured to print an image by using a predetermined ink on a thermally expandable sheet provided with a thermally expandable layer on one surface side; and an expansion device configured to expand the expansion layer by irradiating the thermally expandable sheet with light, wherein the expansion device includes: an irradiation unit configured to irradiate the thermally expandable sheet placed on a placing unit with light; a conveyance unit configured to reciprocably convey the irradiation unit between a first position and a second position; an exhaust fan fixed to a housing and configured to discharge air from the housing; and an air supply fan movable together with the irradiation unit and configured to supply outside air in the housing, and the housing includes an opening for a user to carry in and out the thermally expandable sheet to and from the first position side, and the exhaust fan is provided on the second position side in the housing.

BRIEF DESCRIPTION OF DRAWINGS

FIG. 10 is a flowchart indicating the flow of a three-dimensional image forming process;

FIG. 18 is a flowchart indicating the flow of drying heating.

DESCRIPTION OF EMBODIMENT

Figure 1:
FIG. 1 is a cross-sectional view of a thermally expandable sheet according to an embodiment of the present invention.

An embodiment of the present invention will be described below with reference to the accompanying drawings. In the drawings, the same or corresponding portions are denoted by the same reference numerals.

First Embodiment

<Thermally Expandable Sheet 100>

FIG. 1 illustrates a configuration of a thermally expandable sheet 100 for forming a three-dimensional image by a three-dimensional image forming system 1 according to a first embodiment. The thermally expandable sheet 100 is a medium on which a three-dimensional image is formed by expansion of a preselected portion. The three-dimensional image is a three-dimensional image formed by expanding a part of a two-dimensional sheet in the direction perpendicular to the sheet. In addition, a "three-dimensional image" refers to as a molded object, and the molded object widely includes a general shape, such as a simple shape, a geometric shape, and characters. Furthermore, the molded object also includes an ornament formed as a result of decoration. The ornament refers to the sense of beauty through visual and/or tactile sense. "Three-dimensional image formation" includes not only forming the molded object but also decoration (ornament).

As illustrated in FIG. 1, the thermally expandable sheet 100 includes a base material 101, a thermally expandable layer 102, and an ink receiving layer 103 in this order. Note that FIG. 1 illustrates a cross section of the thermally expandable sheet 100 before a three-dimensional image is formed, that is, in a state where no parts are expanded.

The base material 101 is a sheet-like medium as a base of the thermally expandable sheet 100. The base material 101 is a support that supports the thermally expandable layer 102 and the ink receiving layer 103 and plays a role of maintaining the intensity of the thermally expandable sheet 100. As the base material 101, for example, a general printing paper can be used. Alternatively, the material of the base material 101 may be a synthetic paper, a cloth such as canvas, and a plastic film such as polypropylene, polyethylene terephthalate (PET), and polybutylene terephthalate (PBT) and is not particularly limited.

The thermally expandable layer 102 is laminated on the upper side of the base material 101 and expands when being heated to a temperature equal to or higher than a specified temperature. The thermally expandable layer 102 includes a binder and a thermally expandable agent dispersed in the binder. The binder is a thermoplastic resin such as a vinyl acetate type polymer, and an acryl type polymer. The thermally expandable agent is a thermally expandable microcapsule (micropowder) having a particle size of about 5 to 50 μm and containing a low boiling point vaporizing substance such as propane and butane in the outer shell of the thermoplastic resin. When the thermally expandable agent is heated to a temperature of, for example, 80 to 120° C., the contained substance is vaporized, and foams and distends due to a pressure of the substance. In this way, the thermally expandable layer 102 expands according to the amount of absorbed heat. The thermally expandable agent is also referred to as a foaming agent.

The ink receiving layer 103 is a layer laminated on the upper side of the thermally expandable layer 102 to absorb and receive the ink. The ink receiving layer 103 receives a printing ink used in an ink jet-type printer, a printing toner used in a laser-type printer, a ball pen or fountain pen ink, pencil graphite, and the like. The ink receiving layer 103 is formed of a suitable material for fixing these on a surface. As the material of the ink receiving layer 103, for example, a general-purpose material used for an ink jet paper can be used.

Figure 2:
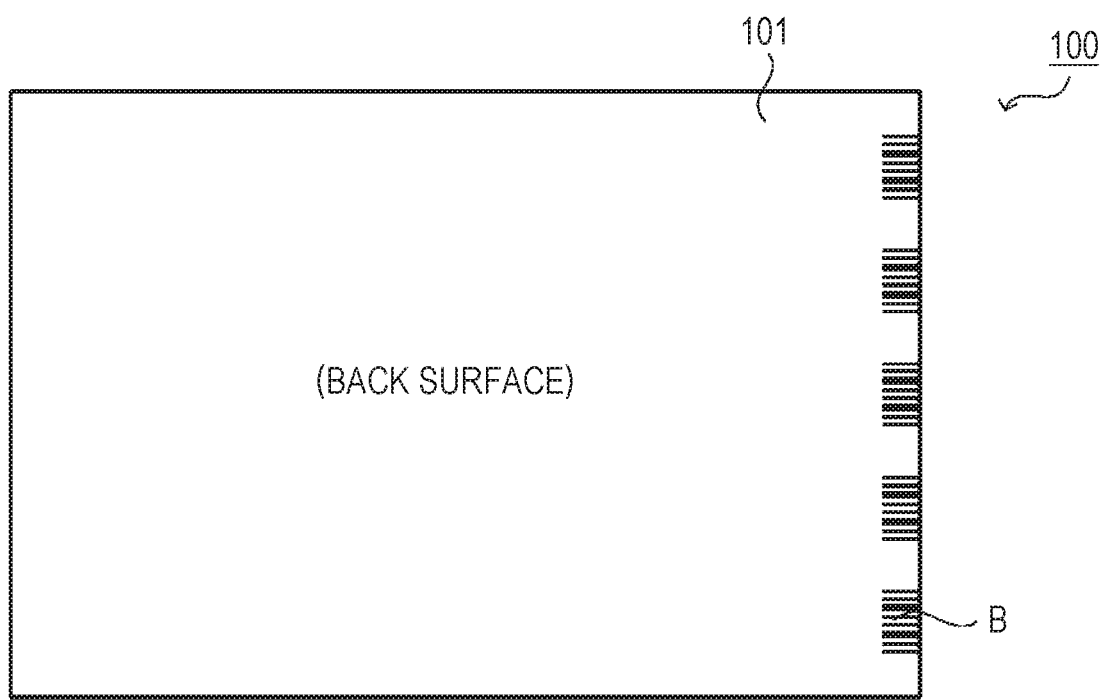
FIG. 2 is a view illustrating a back surface of the thermally expandable sheet illustrated in FIG. 1.

FIG. 2 illustrates the back surface of the thermally expandable sheet 100. The back surface of the thermally expandable sheet 100 is the surface of the thermally expandable sheet 100 on the side of the base material 101 and corresponds to the back surface of the base material 101. On the other hand, the front surface of the thermally expandable sheet 100 is the surface of the thermally expandable sheet 100 on the ink receiving layer 103 side and corresponds to the front surface of the ink receiving layer 103.

As illustrated in FIG. 2, a plurality of barcodes B is attached on the back surface of the thermally expandable sheet 100 along an edge of the back surface. The barcode B is an identifier for identifying the thermally expandable sheet 100 and is information indicating that the thermally expandable sheet 100 is a dedicated sheet for forming a three-dimensional image. The barcode B is read by the expansion device 50 of the three-dimensional image forming system 1 to be described later and is an identifier for determining whether or not to use the thermally expandable sheet 100 in the expansion device 50.

<Three-Dimensional Image Forming System 1>

Figure 3:
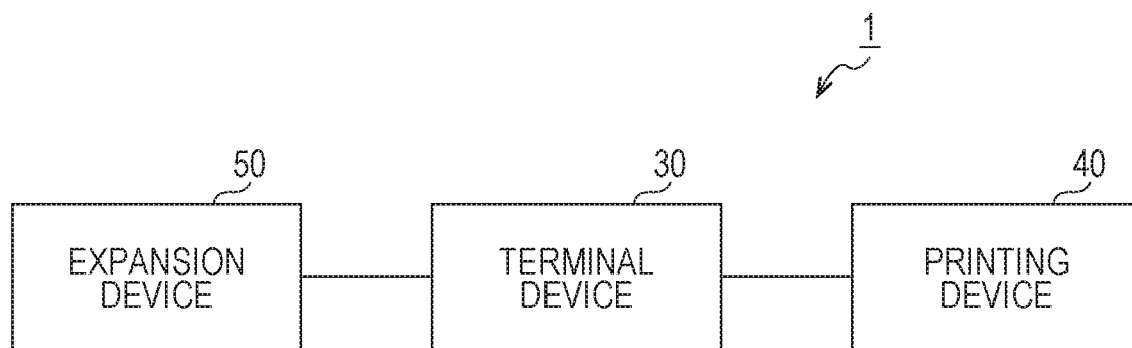
FIG. 3 is a diagram indicating a schematic configuration of a three-dimensional image forming system.

Next, with reference to FIG. 3, a three-dimensional image forming system 1 for forming a three-dimensional image (three-dimensional object or modeled object) on the thermally expandable sheet 100 will be described. As illustrated in FIG. 3, the three-dimensional image forming system (molding system) 1 includes a terminal device 30, a printing device 40, and an expansion device 50.

Figure 4:
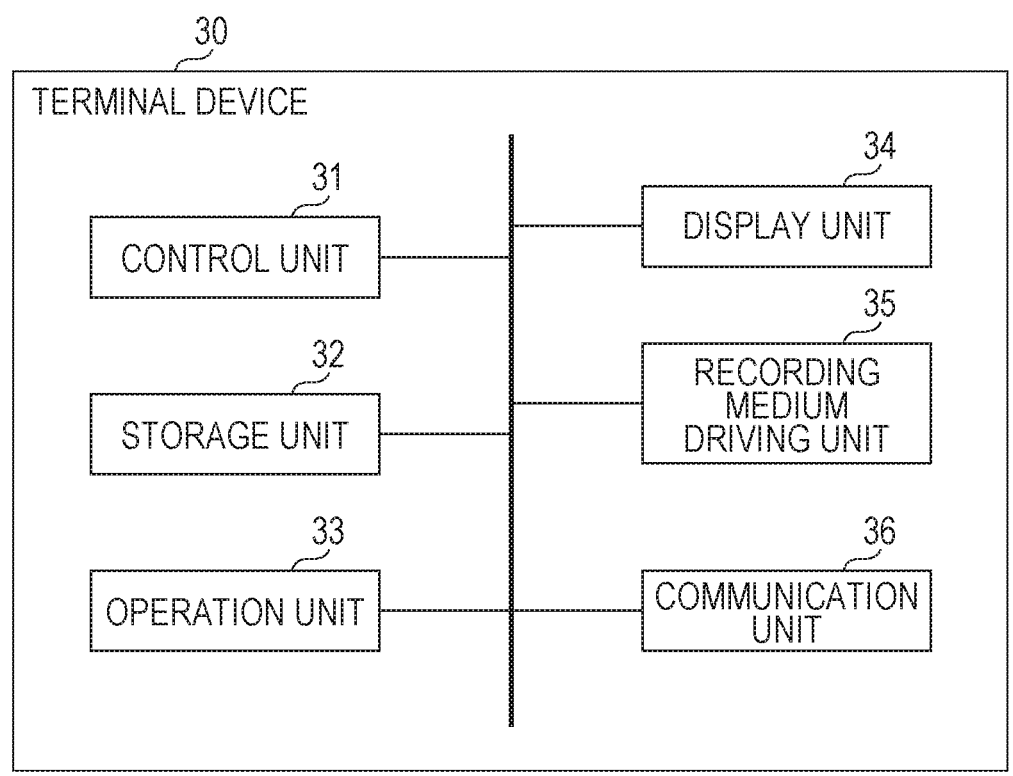
FIG. 4 is a block diagram indicating a configuration of a terminal device.

The terminal device 30 is an information processing device such as a personal computer, a smartphone, and a tablet and is a control unit that controls the printing device 40 and the expansion device 50. As illustrated in FIG. 4, the terminal device 30 includes a control unit 31, a storage unit 32, an operation unit 33, a display unit 34, a recording medium driving unit 35, and a communication unit 36. These units are connected by a bus for transmitting signals.

The control unit 31 includes a central processing unit (CPU), a read only memory (ROM), and a random access memory (RAM). In the control unit 31, the CPU reads a control program stored in the ROM and controls the entire operation of the terminal device 30 while using the RAM as a work memory.

The storage unit 32 is a nonvolatile memory such as a flash memory or a hard disc. The storage unit 32 stores programs or data to be executed by the control unit 31, and color image data, front surface foaming data, and back surface foaming data to be printed by the printing device 40.

The operation unit 33 includes input devices such as a keyboard, a mouse, a button, a touch pad, and a touch panel and accepts an operation from a user. By operating the operation unit 33, a user can input operations of editing color image data, front surface foaming data, and back surface foaming data and an operation on the printing device 40 or the expansion device 50.

The display unit 34 includes a display device such as a liquid crystal display and an organic electro luminescence (EL) display and a display driving circuit for displaying an image on the display device. For example, the display unit 34 displays color image data, front surface foaming data, and back surface foaming data. Further, the display unit 34 displays information indicating the current state of the printing device 40 or the expansion device 50 as necessary.

The recording medium driving unit 35 reads a program or data recorded on a portable recording medium. The portable recording medium is a compact disc (CD)-ROM, a digital versatile disc (DVD)-ROM, a flash memory provided with a universal serial bus (USB) standard connector, or the like. For example, the recording medium driving unit 35 reads and acquires color image data, front surface foaming data, and back surface foaming data from a portable recording medium.

The communication unit 36 has an interface for communicating with an external device including the printing device 40 and the expansion device 50. The terminal device 30 is connected to the printing device 40 and the expansion device 50 via a wired line such as a flexible cable and a wired local area network (LAN), or a wireless line such as a wireless LAN and Bluetooth (registered trademark). Under the control of the control unit 31, the communication unit 36 communicates with the printing device 40 and the expansion device 50 according to at least one of the communication standards.

<Printing Device 40>

The printing device 40 is a printing unit that prints an image on a front or back surface of the thermally expandable sheet 100. The printing device 40 is an ink jet printer that prints an image by a method of forming ink droplets and directly spraying them onto a printing medium.

Figure 5:
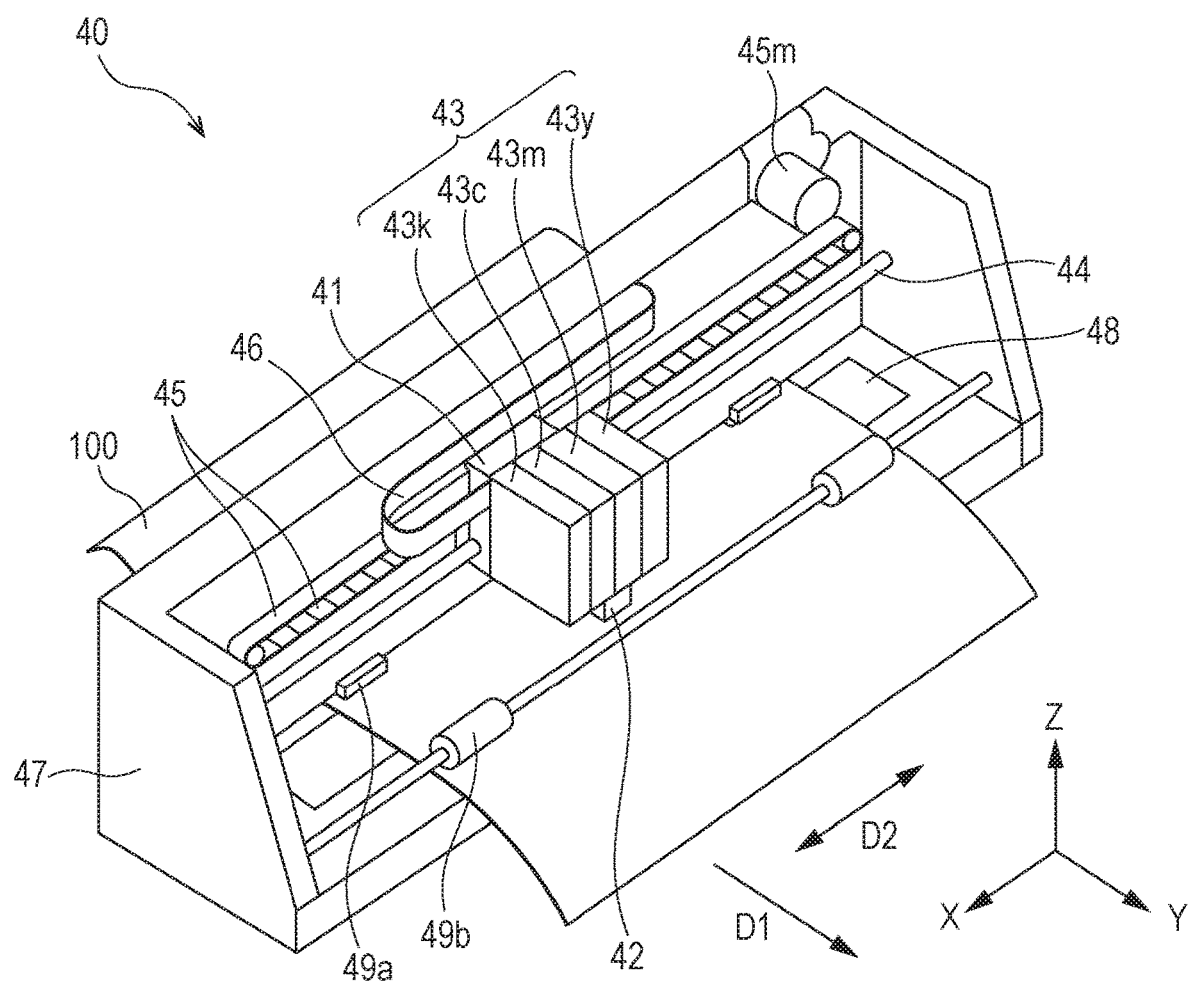
FIG. 5 is a perspective view of a configuration of a printing apparatus.

FIG. 5 illustrates a detailed configuration of the printing device 40. As illustrated in FIG. 5, the printing device 40 is provided with a carriage 41 capable of reciprocating in a main scanning direction D2 (X direction) orthogonal to a sub scanning direction D1 (Y direction) in which the thermally expandable sheet 100 is conveyed.

On the carriage 41, a print head 42 that performs printing and ink cartridges 43 (43k, 43c, 43m, and 43y) that store ink are attached. Color inks of black K, cyan C, magenta M, and yellow Y are contained in the ink cartridges 43k, 43c, 43m, and 43y, respectively. Each color ink is ejected from the corresponding nozzle of the print head 42.

The carriage 41 is slidably supported on a guide rail 44 and is sandwiched by a drive belt 45. When the drive belt 45 is driven by rotation of a motor 45m, the carriage 41 moves in the main scanning direction D2 together with the print head 42 and the ink cartridge 43.

At the bottom of a frame 47, a platen 48 is provided at a position facing the print head 42. The platen 48 extends in the main scanning direction D2 and constitutes a part of a conveying path of the thermally expandable sheet 100. A paper feed roller pair 49a (a lower roller is not illustrated) and a paper discharge roller pair 49b (a lower roller is not illustrated) are provided in the conveying path of the thermally expandable sheet 100. The paper feed roller pair 49a and the paper discharge roller pair 49b convey the thermally expandable sheet 100 supported by the platen 48 in the sub scanning direction D1.

The printing device 40 is connected to the terminal device 30 via a flexible communication cable 46. The terminal device 30 controls the print head 42, the motor 45m, the paper feed roller pair 49a, and the paper discharge roller pair 49b via the flexible communication cable 46. More specifically, the terminal device 30 causes the paper feed roller pair 49a and the paper discharge roller pair 49b to convey the thermally expandable sheet 100. Further, the terminal device 30 rotates the motor 45m to move the carriage 41 and conveys the print head 42 to an appropriate position in the main scanning direction D2.

The printing device 40 acquires image data from the terminal device 30 and performs printing based on the acquired image data. More specifically, the printing device 40 acquires color image data, front surface foaming data, and back surface foaming data as image data. The color image data is data indicating a color image to be printed on a front surface of the thermally expandable sheet 100. The printing device 40 ejects cyan C, magenta M, and yellow Y inks to the print head 42 toward the thermally expandable sheet 100 to print a color image.

On the other hand, the front surface foaming data is data indicating a portion to be foamed and expanded on the front surface of the thermally expandable sheet 100. Further, the back surface foaming data is data indicating a portion to be foamed and expanded on the back surface of the thermally expandable sheet 100. The printing device 40 ejects black K ink containing carbon black toward the thermally expandable sheet 100 to print a grayscale image (grayscale pattern) by black color on the print head 42. The black ink containing carbon black is an example of a material that converts an electromagnetic wave into heat (for example, an electromagnetic wave thermal conversion material such as carbon), that is, a material that converts light into heat.

<Expansion Device 50>

The expansion device 50 is an expansion unit which irradiates a front or back surface of the thermally expandable sheet 100 with light (electromagnetic waves) to heat a grayscale image printed on the front or back surface of the thermally expandable sheet 100 and expand a portion of the thermally expandable sheet 100 on which the grayscale image is printed.

Figure 6:
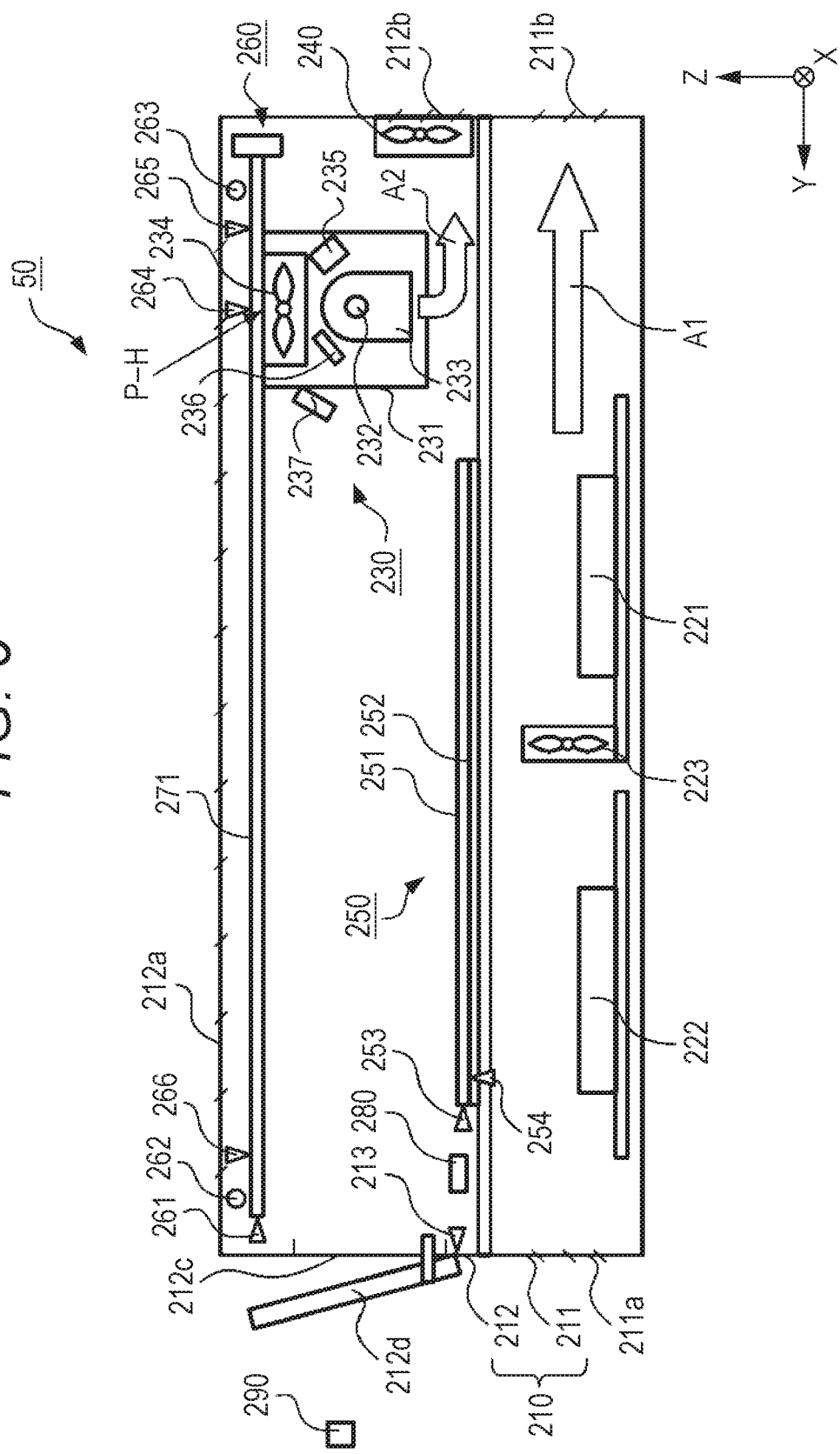
FIG. 6 is a cross-sectional view of a configuration of an expansion device.

FIG. 6 schematically illustrates a configuration of the expansion device 50. In FIG. 6, the X direction corresponds to the width direction of the expansion device 50, the Y direction corresponds to the longitudinal direction of the expansion device 50, and the Z direction corresponds to the vertical direction. The X direction, the Y direction, and the Z direction are orthogonal to each other.

The expansion device 50 includes a box-shaped housing 210. The housing 210 is partitioned into two chambers. A lower housing 211 is a first chamber, and an upper housing 212 is a second chamber. This is because the temperature inside the upper housing 212 rises by irradiation with light from the lamp 232 to be described later, thereby suppressing the influence on a substrate in the lower housing 211 or the like.

A power supply board 221, a control board 222, and a lower fan 223 are stored in the lower housing 211. The power supply board 221 supplies commercial power by converting into electric power suitable for operations of each unit in the expansion device 50, such as the control board 222. The control board 222 receives power from the power supply board 221 and controls overall operations of the expansion device 50 including the operations described herein. The lower fan 223 discharges the air heated by the heat generated from each unit stored in the lower housing 211, such as the power supply board 221 and the control board 222, to the outside of the housing 210 according to the arrow A1. Therefore, in the housing 210, a lower intake unit 211*a* and a lower exhaust unit 211*b* which are openings for the lower housing 211 are provided at arbitrary positions. These openings can have any shape such as a slit.

In addition, the lower housing 211 of the housing 210 can be provided with an opening, a lid, and the like for maintenance of the power supply board 221, the control board 222, and the like.

An upper wall of the upper housing 212 is provided with an upper intake unit which is an opening for sucking outside air. The upper intake unit 212*a* is a slit provided within a movable range of a movable portion 230 to be described later or the like. Further, an upper exhaust unit 212*b*, which is an opening for discharging outside air, is provided on a wall on the far side of the upper housing 212. The upper exhaust unit 212*b* is a slit corresponding to the upper exhaust fan 240 to be described later or the like.

On the left side of the upper housing 212 in the figure, an inlet/outlet 212*c*, which is an opening for a user to carry in and out the thermally expandable sheet, is provided, and an opening/closing door 212*d* corresponding to the inlet/outlet 212*c* is attached. In the present embodiment, the opening/closing door 212*d* is opened and closed by rotating around the lower side portion of the inlet/outlet 212*c*. The opening/closing door 212*d* is provided with an arbitrary handle for a user to open and close the door. A door opening/closing detection sensor 213 for detecting opening/closing of the opening/closing door 212*d* is provided. In FIG. 6, the left side of the drawing is defined as "front side" and the right side is defined as "far side" (the same applies to the following description).

The upper housing 212 stores the movable portion 230, the upper exhaust fan 240, a sheet placing unit 250, and a conveyance unit 260.

The movable portion 230 can reciprocate between the front side and the far side along the conveyance unit 260 in accordance with an operation of the conveyance drive unit 270. The movable portion 230 includes a cover 231, a lamp 232, a reflector 233, an upper air supply fan 234, a thermostat 235, a temperature sensor 236, and a barcode reader 237.

The cover 231 is formed in a box shape for housing the lamp 232, the reflector 233, the upper air supply fan 234, the temperature sensor 236, and the thermostat 235. The upper end of the cover 231 is opened so as to suck the outside air from the intake unit of the housing 210. The lower end of the cover 231 is opened so as to discharge the sucked outside air downward (to vent toward the exhaust fan). The cover 231 is connected to a ball screw 271 to be described later in a known method and further includes a connection mechanism that allows the cover 231 to move between the front side and the far side.

The lamp 232 is an irradiation unit that emits light toward the thermally expandable sheet 100. In the present embodiment, the lamp 232 is a halogen lamp configured in a straight tube shape in the X axis direction.

The reflector 233 has an arcuate inner surface (as illustrated) surrounding the circumferential direction on the rear side of the lamp 232 at the upper portion and a vertical inner surface at the lower portion. The reflector 233 is formed of metal or the like whose inner surface is processed so as to be suitable for reflecting light. The lower end portion of the reflector 233 is opened so as to emit the light of the lamp 232 downward. The reflector 233 is slightly smaller than the inner side of the cover 231 such that air flows between the inner surface of the cover 231 and the outer surface of the reflector 233.

The upper air supply fan 234 is disposed between the intake unit of the housing 210 and the reflector 233, that is, on the rear as viewed from the light irradiation direction. By disposing in this manner, it is possible to efficiently flow the outside air particularly to the reflector 233 and to further flow downward. For example, triple fans are provided in parallel in the right and left direction as viewed from the front side of the upper air supply fan 234. When the upper air supply fan 234 operates, outside air is taken through the intake unit, and wind is blown to the reflector 233. If the reflector 233 is at a high temperature, the reflector 233 may be expanded when the next thermally expandable sheet 100 is set in the expansion device 50, and therefore the reflector 233 is cooled. In addition, the upper air supply fan 234 blows air between the outer surface of the reflector 233 and the inner surface of the cover 231 downward so as to blow the air to the thermally expandable sheet 100. Thereby, the thermally expandable sheet 100 heated by the expansion process is cooled. In the present embodiment, a combination of the cover 231, the lamp 232, the reflector 233, and the upper air supply fan 234 is disposed to vertically face the lower thermally expandable sheet 100.

The temperature sensor 236 is disposed inside the cover 231 and outside the reflector 233. For the temperature sensor 236, for example, a thermistor is used.

The thermostat 235 is disposed inside the cover 231 and outside the reflector 233. The thermostat 235 detects the case where the inside of the cover 231 becomes abnormally high temperature and turns off the lamp 232.

The barcode reader 237 is attached to the outside of the cover 231. The thermally expandable sheet 100 in the present embodiment is a thermally expandable sheet 100 corresponding to the expansion device 50, and a barcode B indicating information such as being the thermally expandable sheet 100 is attached in advance on one side. In the barcode reader 237, when the movable portion 230 is at the home positions P-H, which is the end position on the far side, and the thermally expandable sheet 100 is set on the sheet placing unit 250, the barcode reader 237 reads the barcode B of the thermally expandable sheet 100.

In addition, the movable portion 230 includes a supported portion (not illustrated) corresponding to a rail (not illustrated) of the conveyance unit 260.

The upper exhaust fan 240 is provided adjacent to an exhaust unit provided on a wall on the far side of the housing 210. That is, the upper exhaust fan 240 is disposed on the surface of the upper housing 212 furthest from the opening/closing door 212*d*. This is a position where user's hand does not reach in the normal operation and to smoothly discharge air inside the apparatus. For example, triple fans are provided in parallel in the right-left direction as viewed from the front side of the upper exhaust fan 240. When the upper exhaust fan 240 operates, the heated inside air in the upper housing 212 is discharged to the outside of the housing 210 via the exhaust unit. In the present embodiment, since the upper air supply fan 234 and the upper exhaust fan 240 are operated at the same time, wind in the upper housing 212 flows according to the arrow A2 and is discharged to the outside of the apparatus (at this time, the opening/closing door 212*d* is closed). In the description of the operation to be described later, even if the movable portion 230 moves to the left of the home position P-H in FIG. 6, the flow of the wind is the same.

The sheet placing unit 250 includes a tray 251, a tray stand 252, a tray detection sensor 253, and a sheet size detection sensor 254. In the present embodiment, as an example, the size of the thermally expandable sheet 100 is two sizes, A3 size and A4 size.

The tray 251 includes a tray upper portion 251a and a tray lower portion 251b. The tray 251 can be taken out from the expansion device 50 by sandwiching the thermally expandable sheet 100 between the tray upper portion 251a and the tray lower portion 251b, and disposed at a predetermined position inside the expansion device 50. By using such a tray, the thermally expandable sheet 100 having a plurality of sizes can be used. The tray upper portion 251a on the side facing the lamp 232 is opened like a picture frame so as to sandwich the thermally expandable sheet 100 such that a portion irradiated with light is exposed. That is, the tray 251 sandwiches the edges of four sides of the thermally expandable sheet 100 to fix them.

The tray stand 252 positions and mounts the tray 251. A slide detachment portion 252a is provided between the inlet/outlet 212c and the placement position on the tray stand 252 such that the user can easily take in and out the tray 251 by opening the opening/closing door 212d.

In the expansion device 50, the width as viewed from the front side corresponds to the length of a short side of the A3 size, that is, the length of a long side of the A4 size. Therefore, in the illustrated cross-sectional view, an internal space from the front side to the far side of the upper housing 212 corresponds to the length of a long side of the A3 size.

The tray detection sensor 253 is a sensor to detect that the tray 251 is placed on the tray stand 252. In the illustrated example, the tray detection sensor 253 detects the presence or absence of the tray 251 at the position of the end portion on the front side of the tray 251.

Besides this, in the case of setting the size of the tray 251 to be different between the A3 size and the A4 size, the presence or absence of the tray 251 may be detected at the position of the end portion of the tray 251 of each size.

The sheet size detection sensor 254 is a sensor (size detection unit) for detecting the presence or absence of the thermally expandable sheet 100 and the size of the thermally expandable sheet 100 from the lower side of the thermally expandable sheet 100.

Figure 7:
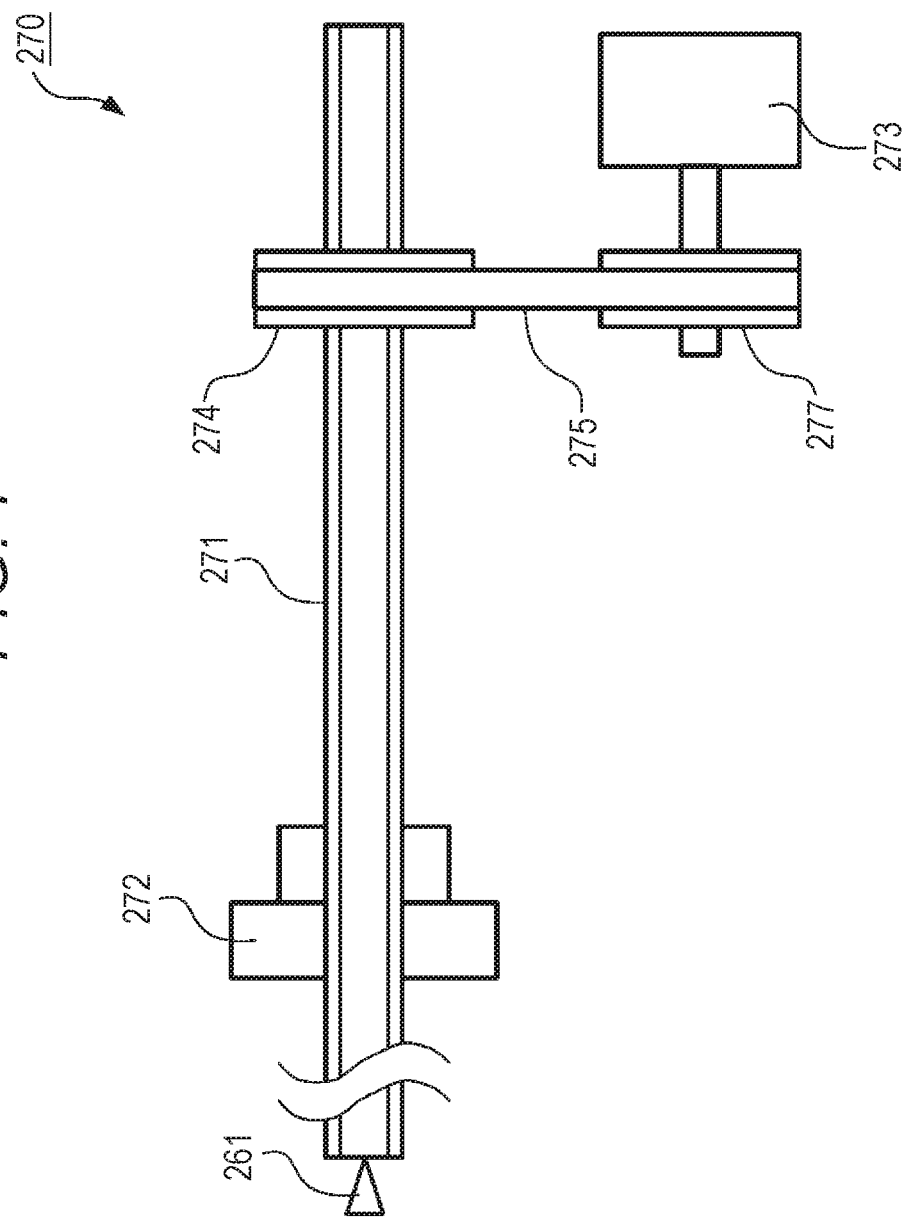
FIG. 7 is a partially enlarged view of a conveyance drive unit of the expansion device.

The conveyance unit 260 includes a conveyance drive unit 270 illustrated in FIG. 7. The conveyance drive unit 270 will be described later. In addition to the conveyance drive unit 270, the conveyance unit 260 includes a ball screw rotation speed detection sensor 261, conveyance termination stop switches 262 and 263, a home position sensor 264, and conveyance drive start and stop sensors 265 and 266.

The conveyance termination stop switches 262 and 263 are provided one by one near the end portions on the front side and the far side. When the movable portion 230 moves in one direction and contacts the conveyance termination stop switches 262 and 263 at the termination portion, the operation of the conveyance drive unit 270 in the direction is stopped.

The home position sensor 264 is a sensor to detect that the movable portion 230 is at the home position P-H in FIG. 1. The home position P-H is at a position closest to the upper exhaust fan 240 (excluding a movement allowance for fine position adjustment) along the movement direction (Y axis direction) of the movable portion 230. When the home position P-H is at this position, it is possible to smoothly wind the air while cooling by the upper air supply fan 234 and the upper exhaust fan 240 after foaming heating to be described later.

The conveyance drive start/stop sensors 265 and 266 are sensors for detecting that the movable portion 230 starts or stops movement by operation of the conveyance drive unit 270 on the front side or the far side.

Further, the conveyance unit 260 includes rails (not illustrated). The rails are provided as a pair in the vicinity of the right and left end portions of the sheet placing unit 250 as viewed from the front side. When the movable portion 230 moves by the ball screw 271, the rails support and guide the supported portions (not illustrated) provided at the right and left side end portions of the movable portion 230.

As illustrated in FIG. 7, the conveyance drive unit 270 includes the ball screw 271, a guide 272, a DC motor 273, pulleys 274 and 277, a belt 275, and a ball screw rotation speed detection sensor 261.

The ball screw 271 is rotatably supported by the guide 272 from the front side to the far side. The ball screw 271 is rotatable in a clockwise direction and a counterclockwise direction as viewed from the front side, and the moving direction of the movable portion 230 is determined according to the rotation direction.

A plurality of the guides 272 is provided in the axial direction of the ball screw 271 including the illustrated guide and fixed to the housing 210.

The DC motor 273 rotates based on a command of the control board 222, and the number of revolutions is controlled to the clockwise or counterclockwise direction when viewed from the axial direction.

The pulleys 274 and 277 are attached to rotating shafts of the ball screw 271 and the DC motor 273, respectively. Grooves such as V-shaped grooves are formed in the outer peripheral portions of the pulleys 274 and 277, and the belt 275 engages with the grooves to connect the pulleys 274 and 277. With such a configuration, the ball screw 271 rotates in a predetermined rotation direction and speed in accordance with operation of the DC motor 273. That is, the movable portion 230 moves in the predetermined direction and speed.

The ball screw rotation speed detection sensor 261 detects the rotation speed of the ball screw 271.

The structure of the expansion device 50, including the embodiment in which the expansion device 50 of the present invention is used, will be further described next.

Figure 8:
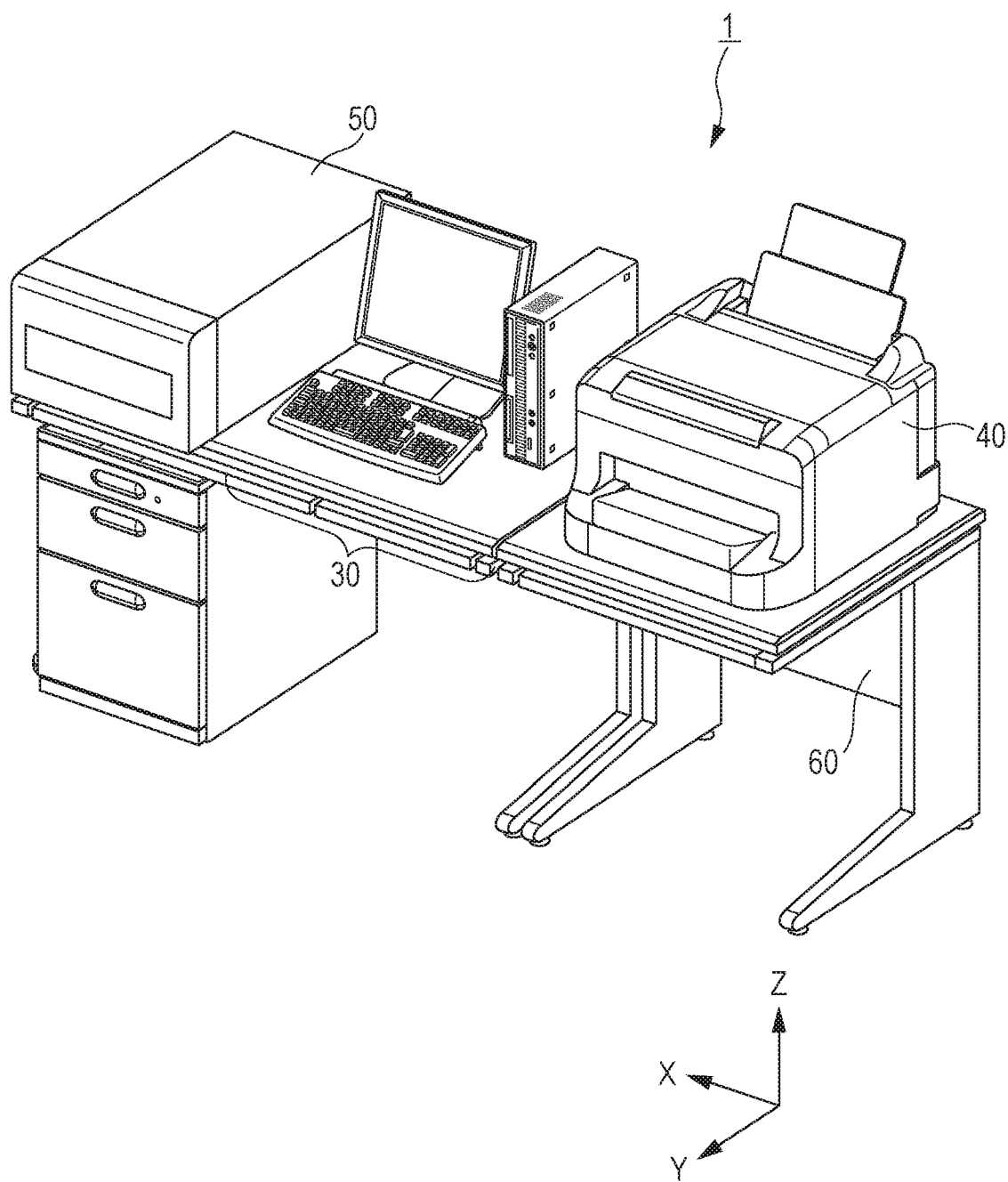
FIG. 8 is an external perspective view of a three-dimensional image forming system.

In FIG. 8, the terminal device 30, the printing device 40, and the expansion device 50 are placed on a desk 60.

The terminal device 30 manages the overall operation of the printing device 40 and the expansion device 50 and controls the printing device 40 and the expansion device 50 based on user's operation.

The printing device 40 prints a symbol on the thermally expandable sheet 100 which is the thermally expandable sheet 100 for foaming.

Figure 9:
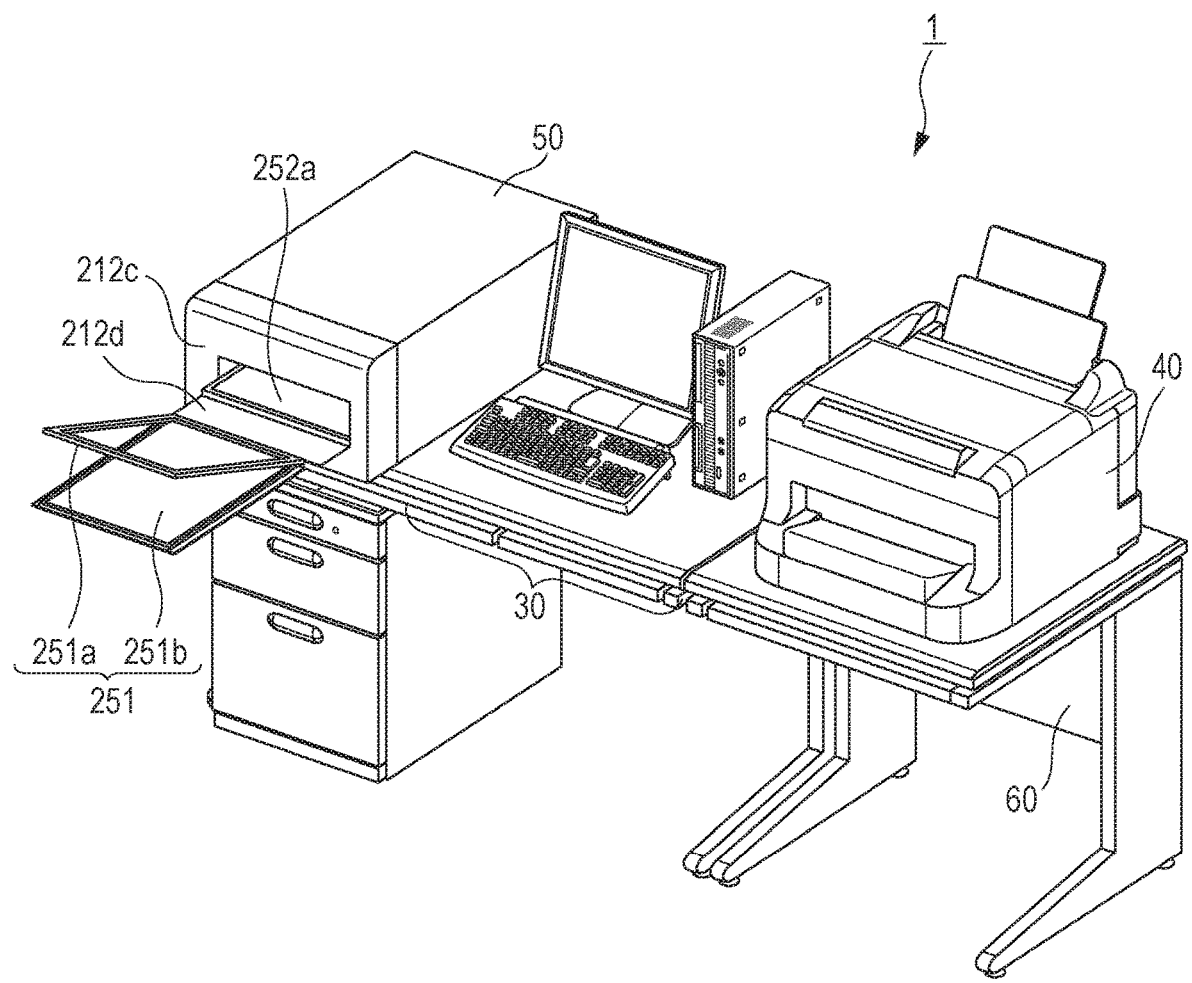
FIG. 9 is a perspective view indicating a state in which a tray is taken out from the expansion device in the three-dimensional image forming system.

In the expansion device 50, FIG. 9 indicates that the opening/closing door 212d is opened, and the tray 251 is taken out from the inlet/outlet 212c. The thermally expandable sheet 100 on which black ink is printed in an expanded portion is sandwiched between the tray upper portion 251a and the tray lower portion 251b of the tray 251. Thereafter, the tray 251 is fed into the expansion device 50 to close the opening/closing door 212d. When foaming and cooling of the thermally expandable sheet 100 is completed, the opening/closing door 212d is opened to take out the tray 251.

Next, with reference to FIGS. 10 to 17 in addition to the above figures, foaming and drying operations and cooling associated therewith will be described particularly in the expansion device 50 according to this embodiment. These operations are based on commands from the control board 222 managed by the terminal device 30, other than a direct operation by a user.

<Three-Dimensional Image Forming Process>

First, the flow of a three-dimensional image forming process performed in the expansion device 50 configured as described above will be described with reference to the flowchart indicated in FIG. 10 and the cross sectional views of the thermally expandable sheet 100 illustrated in FIGS. 11A to 11E.

Figure 11A:
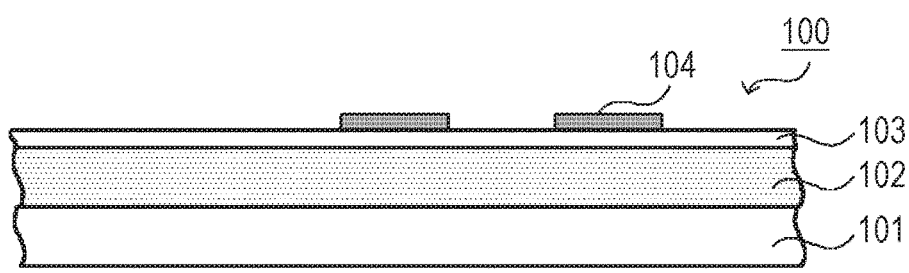
FIGS. 11A to 11E are views illustrating gradually the formation of a three-dimensional image on the thermally expandable sheet illustrated in FIG. 1.

First, a user prepares the thermally expandable sheet 100 before a three-dimensional image is formed and specifies color image data, front surface foaming data, and back surface foaming data via the operation unit 33 of the terminal device 30. Then, the thermally expandable sheet 100 is inserted into the printing device 40 with its front surface facing upward. The printing device 40 prints a light-to-heat conversion layer 104 on the front surface of the inserted thermally expandable sheet 100 (step S1). The light-to-heat conversion layer 104 is a layer formed of a material that converts light into heat, specifically, black ink containing carbon black. The printing device 40 ejects black ink containing carbon black on the front surface of the thermally expandable sheet 100 according to the specified front surface foaming data. As a result, as illustrated in FIG. 11A, the light-to-heat conversion layer 104 is formed on the ink receiving layer 103.

Figure 11B:
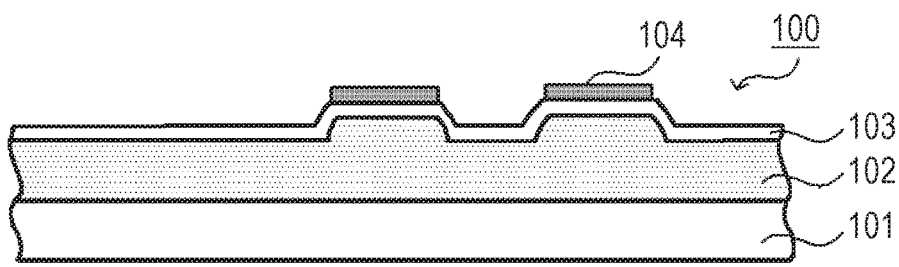

Secondly, a user inserts the thermally expandable sheet 100 on which the light-to-heat conversion layer 104 is printed into the expansion device 50 with its front surface facing upward. The expansion device 50 irradiates the front surface of the inserted thermally expandable sheet 100 with light by an irradiation unit corresponding to the movable portion 230 including the lamp 232 (step S2). The light-to-heat conversion layer 104 printed on the front surface of the thermally expandable sheet 100 generates heat by absorbing the emitted light. As a result, as illustrated in FIG. 11B, a portion of the thermally expandable sheet 100, on which the light-to-heat conversion layer 104 is printed, swells and expands.

Figure 11C:
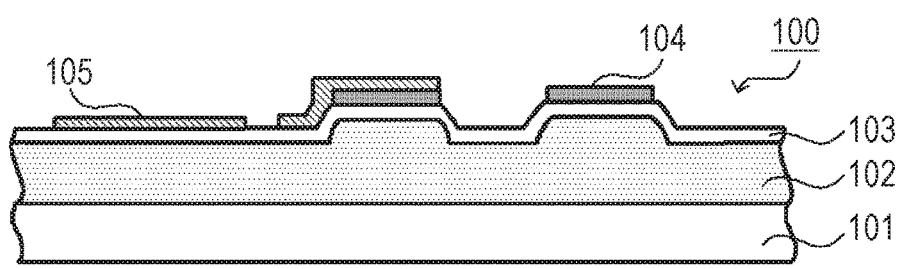

Thirdly, a user inserts the thermally expandable sheet 100 of which front surface has been heated and expanded, into the printing device 40 with its front surface facing upward. The printing device 40 prints a color ink layer 105 on the front surface of the inserted thermally expandable sheet 100 (step S3). Specifically, the printing device 40 ejects inks of cyan C, magenta M, and yellow Y onto the surface of the thermally expandable sheet 100 according to the specified color image data. As a result, as illustrated in FIG. 11C, the color ink layer 105 is formed on the ink receiving layer 103 and the light-to-heat conversion layer 104.

In the case of printing an image of black or gray color in the color ink layer 105, the printing device 40 forms the color ink layer 105 by mixing inks of three colors of cyan C, magenta M, and yellow Y, or by further using a black ink that does not contain carbon black. This prevents the portion on which the color ink layer 105 is formed from being heated in the expansion device 50.

Fourthly, a user turns over the thermally expandable sheet 100 on which the color ink layer 105 is printed and inserts the thermally expandable sheet 100 into the expansion device 50 with its back surface facing upward. The expansion device 50 heats the thermally expandable sheet 100 from the back surface by irradiating the back surface of the inserted thermally expandable sheet 100 with light by the irradiation unit. As a result, the expansion device 50 volatilizes solvent contained in the color ink layer 105 to dry the color ink layer 105 (step S4). By drying the color ink layer 105, the thermally expandable sheet 100 can be easily expanded in a later step.

Figure 11D:
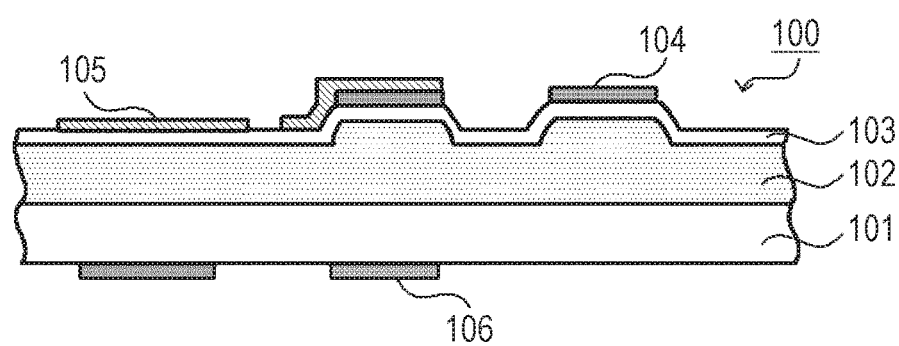

Fifthly, a user inserts the thermally expandable sheet 100 on which the color ink layer 105 is printed into the printing device 40 with its back surface facing upward. The printing device 40 prints the light-to-heat conversion layer 106 on the back surface of the inserted thermally expandable sheet 100 (step S5). As with the light-to-heat conversion layer 104 printed on the front surface of the thermally expandable sheet 100, the light-to-heat conversion layer 106 is a layer formed of a material that converts light into heat, specifically, black ink containing carbon black. The printing device 40 ejects black ink containing carbon black onto the back surface of the thermally expandable sheet 100 according to the specified back surface foaming data. As a result, as indicated in FIG. 11D, the light-to-heat conversion layer 106 is formed on the back surface of the base material 101.

Figure 11E:
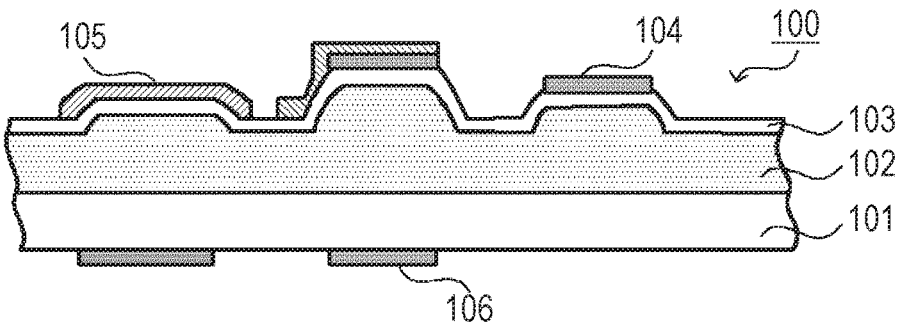
Figure 12:
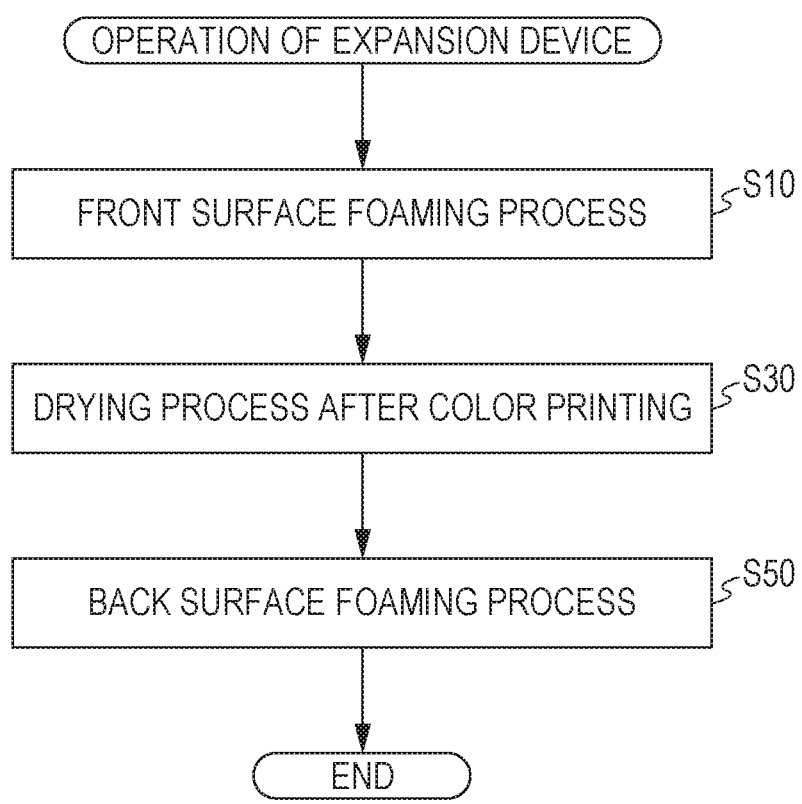
FIG. 12 is a flowchart indicating the flow of operations of the expansion device.

Sixthly, a user inserts the thermally expandable sheet 100 on which the light-to-heat conversion layer 106 is printed into the expansion device 50 with its back surface facing upward. The expansion device 50 irradiates the back surface of the inserted thermally expandable sheet 100 with light by the irradiation unit (step S6). The light-to-heat conversion layer 106 printed on the back surface of the thermally expandable sheet 100 generates heat by absorbing the emitted light. As a result, as illustrated in FIG. 11E, the portion of the thermally expandable sheet 100, on which the light-to-heat conversion layer 106 is printed, swells and expands.

In FIGS. 11A to 11E, for clarification, the light-to-heat conversion layer 104 and the color ink layer 105 are formed on the ink receiving layer 103. However, more precisely, the color ink and the black ink are absorbed inside the ink receiving layer 103, and therefore the light-to-heat conversion layer 104 and the color ink layer 105 are formed in the ink receiving layer 103.

As described above, a portion of the thermally expandable sheet 100, on which the light-to-heat conversion layers 104 and 106 are formed, expands, and a color three-dimensional image is formed on the thermally expandable sheet 100. Since the light-to-heat conversion layers 104 and 106 are heated as its density increases, the light-heat converting layers 104 and 106 further expand. Therefore, three-dimensional images of various shapes can be obtained by adjusting the density of the light-to-heat conversion layers 104 and 106 according to the target height.

Figure 15:
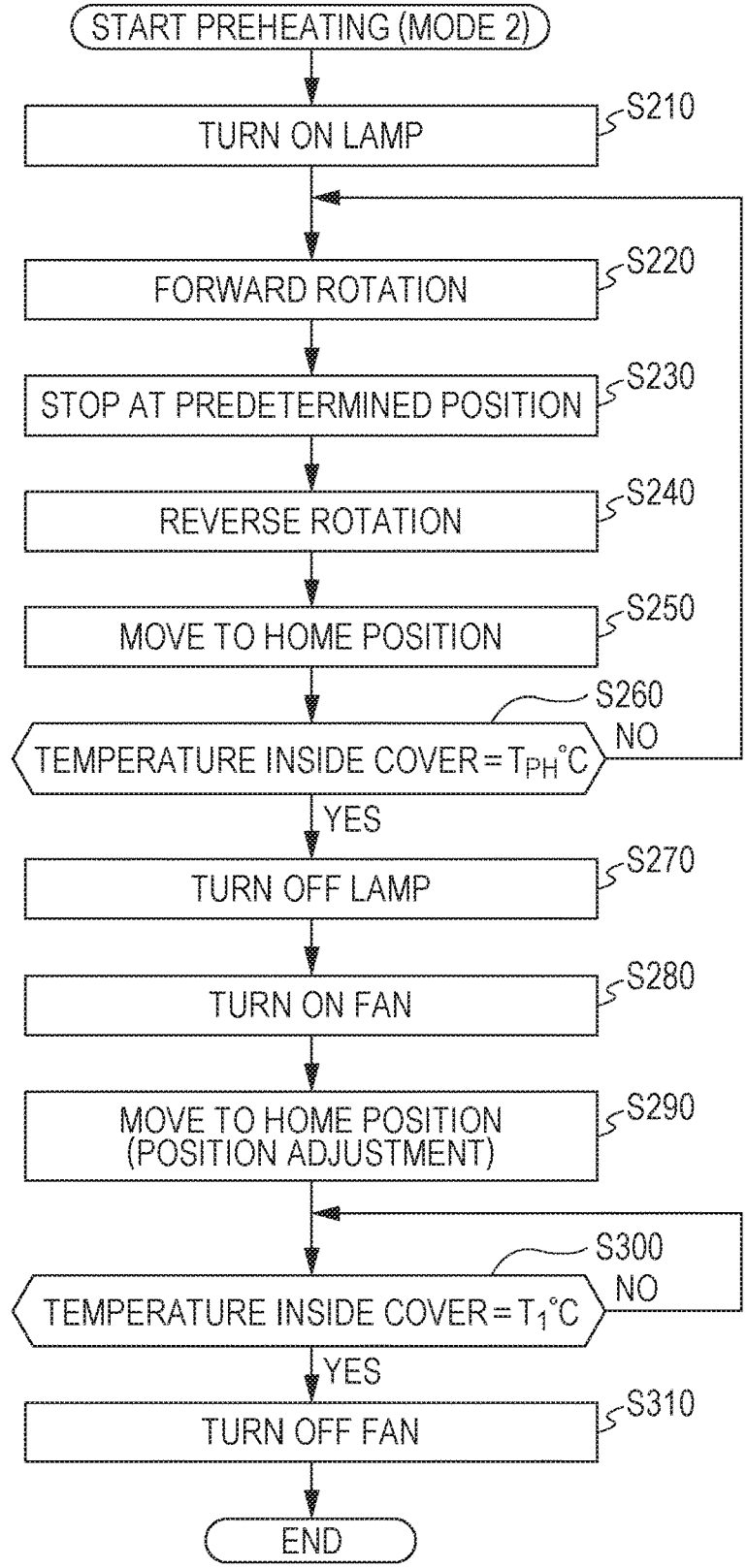
FIG. 15 is a flowchart indicating the flow of preheating (second mode)
Figure 16:
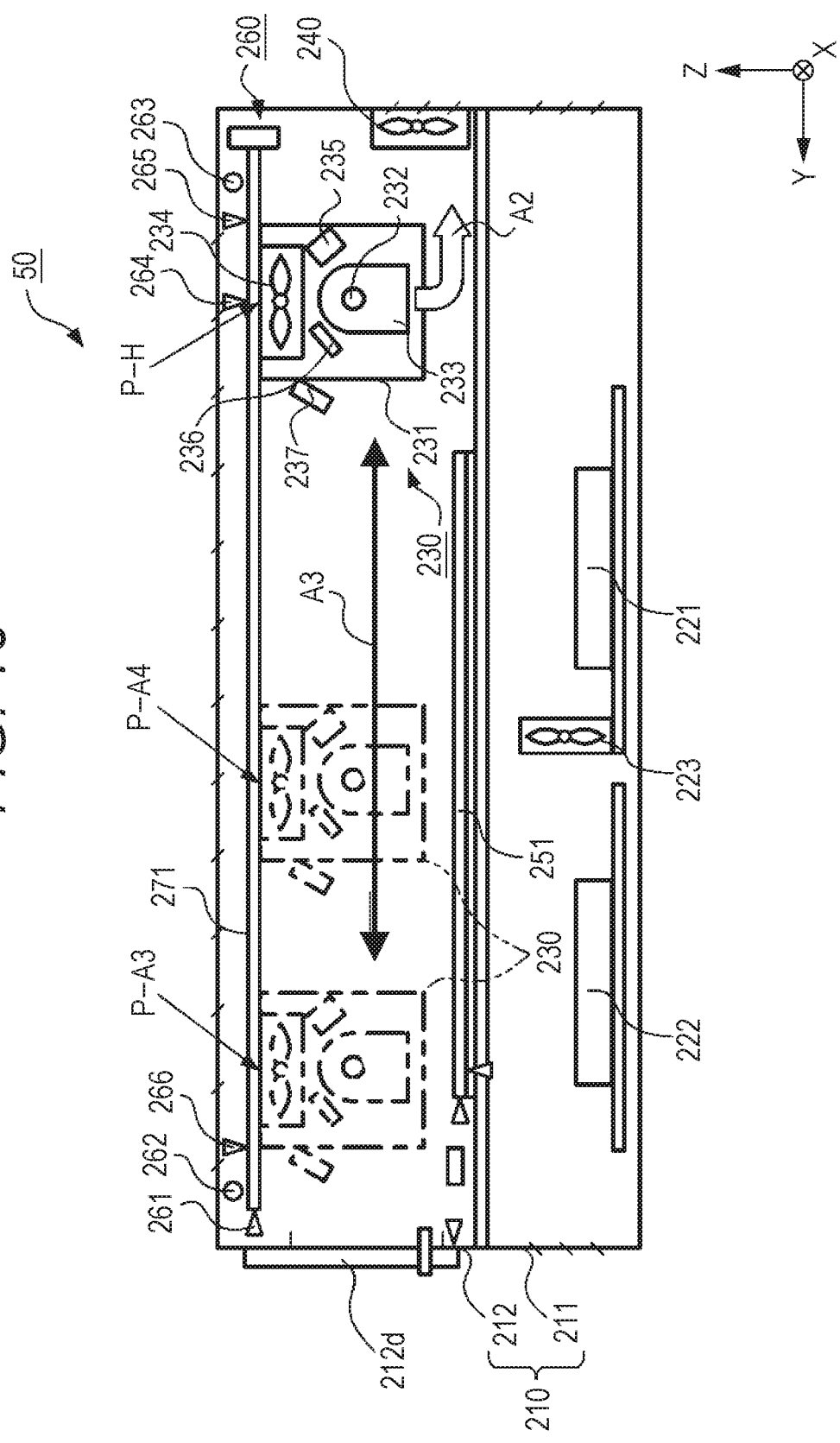
FIG. 16 is a cross-sectional view indicating an example of a position of a movable portion of the expansion device.

Either one of the process of heating the thermally expandable sheet 100 from the front surface and the process of heating from the back surface may be omitted. For example, when only the front surface of the thermally expandable sheet 100 is heated and expanded, steps S5 and S6 in FIG. 10 are omitted. On the other hand, in the case where only the back surface of the thermally expandable sheet 100 is heated and expanded, steps S1 and S2 in FIG. 15 are omitted. Further, printing of the color image in step S3 may be performed after the process of heating the thermally expandable sheet 100 from the back surface in step S6.

Further, when forming a monochrome three-dimensional image, the printing device 40 may print a monochrome image instead of a color image in step S3. In this case, a layer of black ink is formed on the ink receiving layer 103 and the light-to-heat conversion layer 104 instead of the color ink layer 105.

To perform the three-dimensional image forming process of the thermally expandable sheet 100 as described above, as illustrated in FIG. 12, the expansion device 50 includes a front surface foaming process (step S10), and a drying process (step S30) and a back surface foaming process (step S50) after color printing. Hereinafter, the processes will be described in more detail with reference to FIGS. 13 to 18.

<Front Surface Foaming Process>

Figure 13:
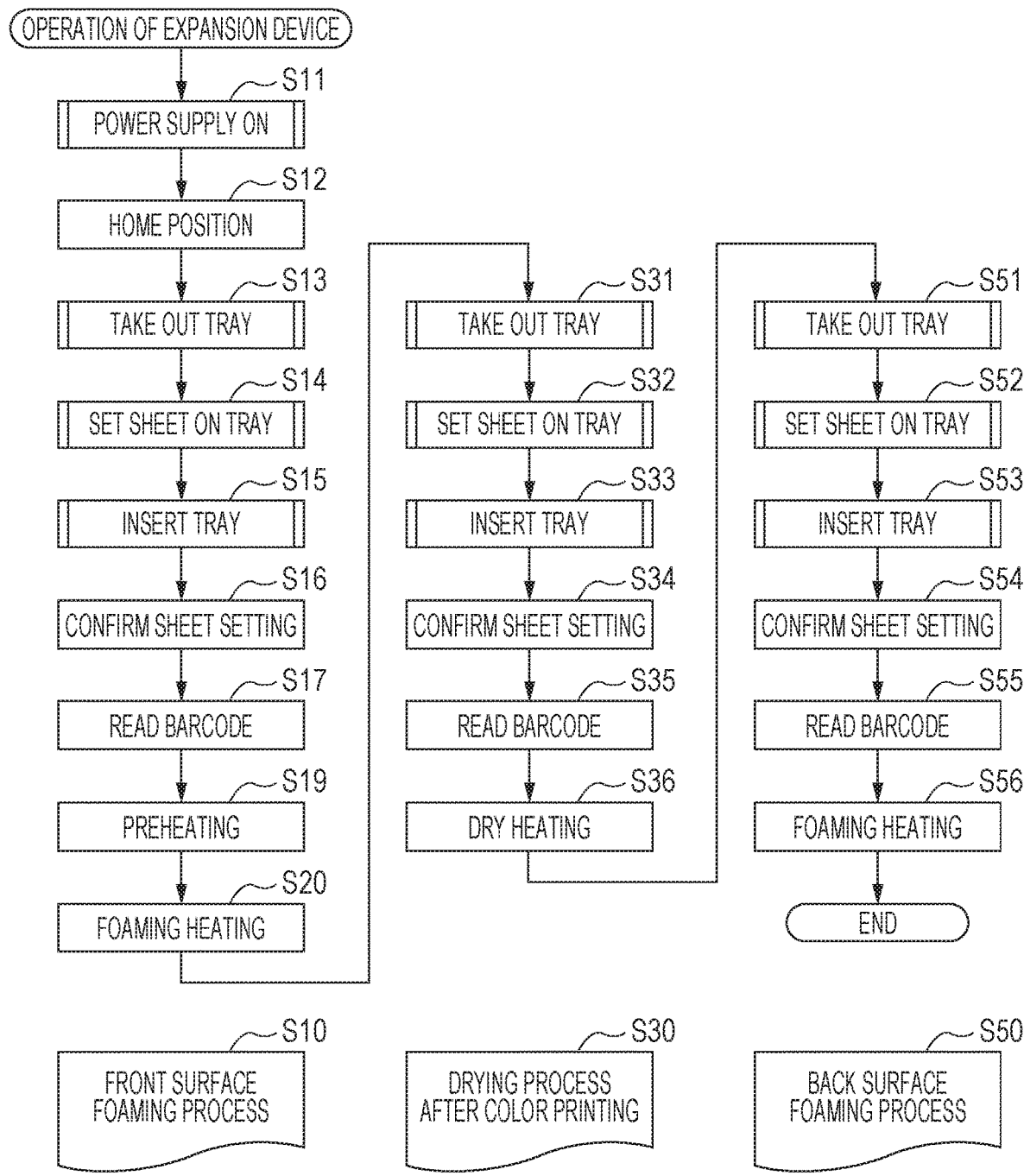
FIG. 13 is a flowchart detailing the operations of the expansion device for each process.
Figure 14:
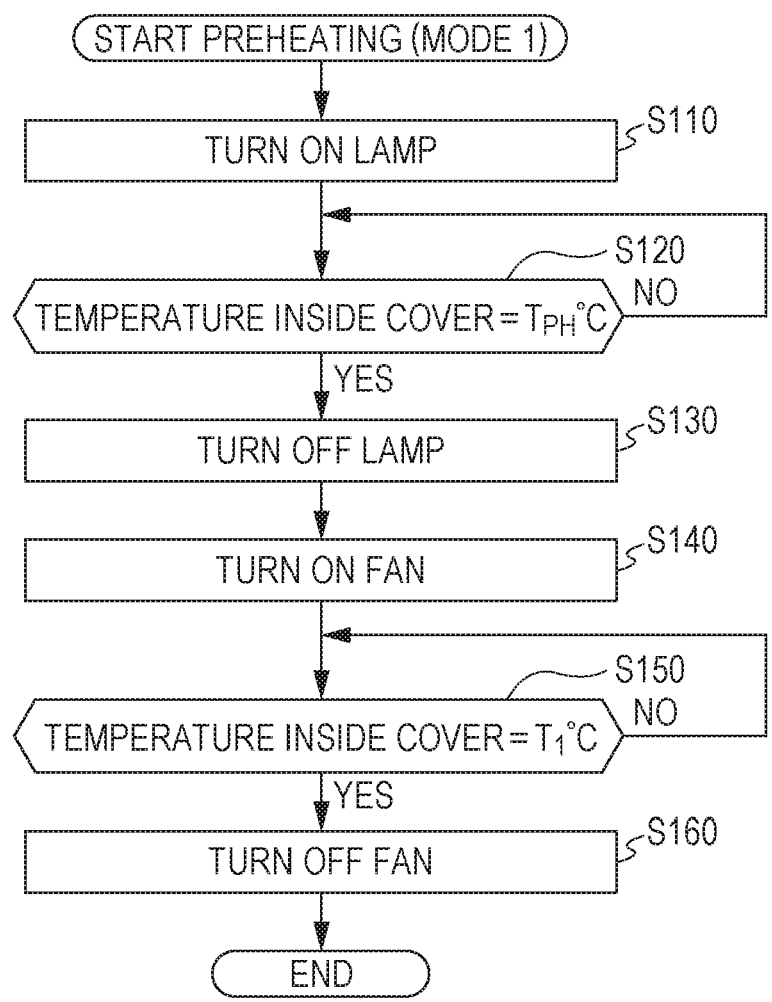
FIG. 14 is a flowchart indicating the flow of preheating (first mode)

As illustrated in FIG. 13, in the front surface foaming process, when a user first turns on a power supply (step S11), the expansion device 50 sets the movable portion 230 at the home position (step S12). The home position is the position of the movable portion 230 in FIG. 6 and is the position of the home position P-H in FIG. 16. At this time, the home position sensor 264 detects that the movable portion 230 is at the home position P-H. In the home position operation of step S12, first, it is determined whether the movable portion 230 is at the home position P-H. If not, the movable portion 230 is moved to the home position P-H. Subsequently, the movable portion 230 is further moved from the home position P-H and then returned to the home position P-H. At the time of returning, after detecting that the home position sensor 264 is at the home position P-H, the movable portion 230 is slightly moved.

Subsequently, a user takes out the tray 251 (step S13), sets the thermally expandable sheet 100 (referred to as "sheet" in the flowchart) in the tray 251 (step S14), and inserts the tray 251 into the expansion device 50 (step S15). At this time, as illustrated in FIG. 11A, the front surface of the thermally expandable sheet 100 on which the light-to-heat conversion layer 104 is printed faces the lamp 232. Then, the thermally expandable sheet 100 is sandwiched between the tray upper portion 251a and the tray lower portion 251b of the tray 251 illustrated in FIG. 9. Then, the tray 251 is set on the tray stand 252 via a slider. Further, in step S15, a user may perform an operation such as pushing a start button (not illustrated) of the expansion device 50.

Subsequently, it is confirmed that the thermally expandable sheet 100 is set (step S16). At this time, the tray detection sensor 253 detects the tray 251, and the sheet size detection sensor 254 detects the size of the thermally expandable sheet 100.

Subsequently, the barcode reader 237 reads the barcode B printed on the thermally expandable sheet 100 (step S17). Since the thermally expandable sheet 100 used for the expansion device 50 is a dedicated sheet for heating, it is confirmed that a general sheet is not incorrectly set.

Subsequently, preheating in the expansion device 50 is performed (step S19). The preheating is carried out when the power supply is turned ON as in step S11, or when, for example, one hour or more have passed without foaming heating or drying heating. The preheating will be described with reference to FIGS. 14 and 15.

Subsequently, foaming heating is carried out on the thermally expandable sheet 100 (step S20). The foaming heating will be described with reference to FIG. 17. Upon completion of step S20, step S10 is completed.

Two examples of preheating (step S19) will be described. First, in the first mode illustrated in FIG. 14, the lamp 232 is turned on (ON) (step S110). The lamp 232 is a halogen lamp, and the temperature rises in a short time.

Subsequently, it is determined whether or not the temperature inside a cover reaches a predetermined preheat set temperature $T_{PH}$° C. (step S120). At this time, the temperature detected by the temperature sensor 236 in the cover 231 is used. If it has not reached $T_{PH}$° C. (step S120: No), the process is repeated until the temperature is reached.

When the temperature inside the cover reaches the predetermined preheat setting temperature $T_{PH}$° C. (step S120: Yes), the lamp 232 is turned off (OFF) (step S130), and the upper air supply fan 234 of the movable portion 230 and the upper exhaust fan 240 provided on the far side are operated (ON) (step S140). Therefore, after increasing the temperature in the one end cover 231, the temperature is lowered in steps S130 and S140.

Subsequently, it is determined whether or not the temperature inside the cover has reached the predetermined set temperature $T_1$° C. (step S150). At this time, the temperature detected by the temperature sensor 236 in the cover 231 is used. If it has not reached $T_1$° C. (step S150: No), the process is repeated until the temperature is reached.

When the temperature inside the cover reaches the predetermined set temperature $T_1$° C. (step S150: Yes), the upper air supply fan 234 and the upper exhaust fan 240 are stopped (OFF) (step S160). As a result, preheating of mode 1 is completed.

FIG. 15 is a flowchart indicating an example of preheating in mode 2. First, as in step S110 of mode 1, the lamp 232 is turned ON (step S210).

Subsequently, the ball screw 271 is rotated forward to move the movable portion 230 from the far side to the front side (step S220). In the present specification, along the arrow A3, the movable portion 230 moves from the far side toward the front side (from the right side to the left side in FIG. 16) in the "forward rotation", and the movable portion 230 moves from the front side toward the far side (from the left side to the right side in FIG. 16) in the "reverse rotation".

Subsequently, the movable portion 230 is stopped at a predetermined position (step S230). In this preheating, the predetermined position is a terminal position (A3) P-A3 in FIG. 16.

Subsequently, the ball screw 271 is reversely rotated to move the movable portion 230 from the front side to the far side (step S240), and the movable portion 230 is moved to the home position P-H (step S250). The home position operation in step S250 is the same as step S12.

Subsequently, as in step S150 of mode 1, it is determined whether or not the temperature inside the cover has reached the predetermined preheat setting temperature $T_{PH}$° C. (step S260). If it has not reached $T_{PH}$° C. (step S260: No), the process returns to step S220 and repeatedly moves the movable portion 230 while heating.

When the temperatures inside the cover reaches the predetermined preheat setting temperature $T_{PH}$° C. (step S260: Yes), the lamp 232 is turned off (OFF) (step S270) as in steps S130 and S140 of mode 1, and the upper air supply fan 234 of the movable portion 230 and the upper exhaust fan 240 on the far side are operated (ON) (step S280). Therefore, after increasing the temperature in the one end cover 231, the temperature is lowered in steps S130 and S140.

Subsequently, the movable portion 230 is moved to the home position P-H (step S290). The home position operation in step S290 is the same as in step S12. However, since the home position P-H has already been set in step S250, the position adjustment in step S290 is fine adjustment. Thereafter, as in steps S150 and S160 in mode 1, it is determined whether or not the temperature inside the cover has reached the predetermined set temperature $T_1$° C. (step S300). When it has reached the temperature (step S300: Yes), the upper air supply fan 234 and the upper exhaust fan 240 are stopped (OFF) (step S310). As a result, preheating in mode 2 is completed.

Figure 17:
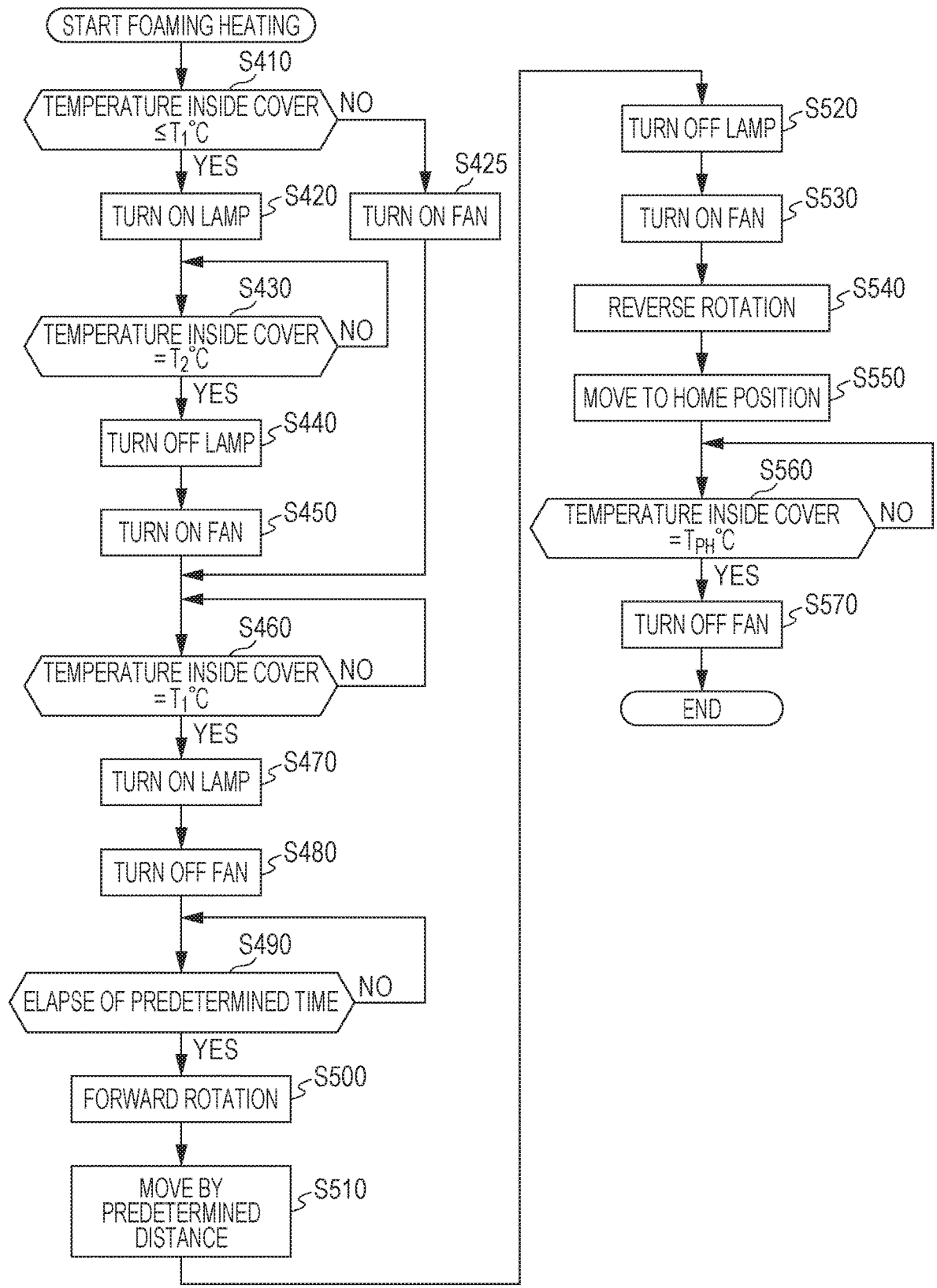
FIG. 17 is a flowchart indicating the flow of foaming heating.

Hereinafter, the foaming heating process (step S20) will be described with reference to the flowchart of FIG. 17.

First, it is determined whether or not the temperature inside the cover is equal to or lower than $T_1$° C. (step S410). If the temperature is $T_1$° C. or less (step S410: Yes), the lamp 232 is turned ON (step S420) for heating.

Subsequently, it is determined whether or not the temperature inside the cover has reached the predetermined $T_2°$ C. ($T_1 < T_2$) by heating (step S430). If it has not reached $T_2°$ C. (step S430: No), the process is repeated until the temperature is reached.

When the temperature inside the cover has reached the predetermined $T_2°$ C. (step S430: Yes), the lamp 232 is turned OFF (step S440), and the upper air supply fan 234 and the upper exhaust fan 240 are turned ON (step S450) for cooling.

When the temperature inside the cover exceeds $T_1°$ C. in the above-described step S410 (step S410: No), the upper air supply fan 234 and the upper exhaust fan 240 are turned ON (step S425) for cooling.

Subsequently, it is determined whether or not the temperature inside the cover has reached $T_1°$ C. by cooling (step S460). If it has not reached $T_1°$ C. (step S460: No), the process is repeated until the temperature is reached.

When the temperature inside the cover has reached $T_1°$ C. (step S460: Yes), the lamp 232 is turned ON (step S470), and the upper air supply fan 234 and the upper exhaust fan 240 are turned OFF (step S480) for heating.

Subsequently, it is determined whether or not a predetermined time preset by a timer has elapsed (step S490). If the predetermined time has not elapsed (step S490: No), the process is repeated until the time is reached.

When the predetermined time has elapsed (step S490: Yes), the ball screw 271 is rotated forward (step S500), and the movable portion 230 is moved by a predetermined distance (step S510). That is, in these steps, the surface facing the lamp 232 of the thermally expandable sheet 100 is foamed (FIG. 11B or 11E). At this time, the predetermined distance depends on the size of a sheet. When the thermally expandable sheet 100 has an A4 size, the predetermined distance is a distance from the home position P-H in FIG. 16 to the terminal position (A4) P-A4, and when the thermally expandable sheet 100 has an A3 size, the predetermined distance is a distance from the home position P-H in FIG. 16 to the terminal position (A3) P-A3.

Subsequently, the lamp 232 is turned OFF (step S520), the upper air supply fan 234 and the upper exhaust fan 240 are turned ON (step S530) for cooling. During cooling of the thermally expandable sheet 100, to prevent vapor of ink generated by heating from staining the thermally expandable sheet 100 or the like, preferably cooling air by the fan smoothly flows above the thermally expandable sheet 100 and is discharged. Therefore, in the present embodiment, outside air is sucked from the upper side on the side where foaming heating has been completed (in this example, on the front side) and discharged from the opposite side (the far side end portion of the upper housing 212).

Subsequently, while cooling, the ball screw 271 is rotated in the reverse direction (step S540), and the movable portion 230 is moved to the home position P-H (step S550).

Subsequently, it is determined whether or not the temperature inside the cover has reached $T_{PH}°$ C. by cooling (step S560). If it has not reached $T_{PH}°$ C. (step S560: No), the process is repeated until the temperature is reached.

When the temperature inside the cover has reached $T_{PH}°$ C. (step S560: Yes), the upper air supply fan 234 and the upper exhaust fan 240 are turned OFF (step S570), and the foaming heating process is completed. In addition, as a result, the front surface foaming process (step S10) is completed.

<Drying Process After Color Printing>

Next, with reference to FIGS. 13 and 18, a drying process (step S30) after color printing will be described.

In FIG. 13, after the front surface foaming process (step S10) is completed, the tray 251 is taken out (step S31), the thermally expandable sheet 100 is set on the tray 251 (step S32) as in steps S13 to S15, and the tray 251 is inserted into the expansion device 50 (step S33). At this time, after taking out the thermally expandable sheet 100 from the tray 251, a user prints a color ink layer on the front surface of the thermally expandable sheet 100 by the printing device 40 (FIG. 11C), and then the thermally expandable sheet 100 is sandwiched in the tray 251 such that the front surface thereof faces the lamp 232.

Subsequently, as in steps S16 and S17, it is confirmed that the thermally expandable sheet 100 has been set (step S34), and the barcode reader 237 reads the barcode B printed on the thermally expandable sheet 100 (step S35).

Subsequently, drying heating is performed (step S36). Since the color printed ink may not dry immediately, it is preferable to dry the printed portion of the thermally expandable sheet 100 before foaming processing on the back surface. Therefore, in this embodiment, a drying process (step S30) after color printing is performed.

More specifically, as indicated in FIG. 18, when the drying process is started, the lamp 232 is turned ON (step S610), the ball screw 271 is rotated forward (step S620), and the movable portion 230 is moved forward from the home position P-H side.

Subsequently, when the movable portion 230 moves by a predetermined distance, the movement is stopped (step S630). In this case, the predetermined distance is a distance corresponding to the size of the thermally expandable sheet 100 (the distance from the home position P-H to the terminal position (A4) P-A4 or the position (A3) P-A3) as in step S510.

Subsequently, the lamp 232 is turned OFF (step S640), the upper air supply fan 234 and the upper exhaust fan 240 are turned ON (step S650) for cooling.

Subsequently, the ball screw 271 is rotated in the reverse direction (step S660), and the movable portion 230 is moved to the home position (step S670).

In drying heating, since the moving speed of the movable portion 230 is higher than that of foaming heating, the temperature is relatively low, and the thermally expandable sheet 100 is not foamed. Along with this, steps S610 to S670 are repeated until drying is performed predetermined times (step S680: No) for certain drying.

When drying has been performed predetermined times (step S680: Yes), the drying heating process is completed.

In addition, the drying process (step S30) after color printing is completed.

<Back Surface Foaming Process>

Next, the back surface foaming process (step S50) will be described with reference to FIGS. 13 and 17.

In FIG. 13, after completion of the drying process (step S30) after color printing, the tray 251 is taken out (step S51), the thermally expandable sheet 100 is set in the tray 251 (step S52), the tray 251 is inserted into the expansion device 50 (step S53) as in steps S13 to S15. At this time, after taking out the thermally expandable sheet 100 from the tray 251, a user prints a light-heat conversion layer on the back surface of the thermally expandable sheet 100 by the printing device 40 (FIG. 11D), and then the thermally expandable sheet 100 is sandwiched in the tray 251 such that the back surface thereof faces the lamp 232.

Subsequently, as in steps S16 and S17, it is confirmed that the thermally expandable sheet 100 has been set (step S54), and the barcode reader 237 reads the barcode B printed on the thermally expandable sheet 100 (step S55).

Subsequently, foaming heating is performed in the same manner as in step S20 (step S56). As illustrated in FIG. 11E, by irradiating, with light, the light-to-heat conversion layer 106 provided on the back surface of the thermally expandable sheet 100, the front surface of the thermally expandable sheet 100 further expands. As a result, the back surface foaming process (step S50) is completed, and the series of operations of the expansion device 50 illustrated in FIG. 13 is completed.

As described above, in the present embodiment, after the thermally expandable sheet 100 is irradiated with light while moving the lamp 232 during foaming heating in the upper housing 212, the lamp 232 is turned off, and the upper air supply fan 234 and the upper exhaust fan 240 are moved while operating.

With such a configuration, the expansion process is performed after closing the opening/closing door 212d after disposing the thermally expandable sheet 100 in the upper housing 212. Therefore, the expansion process can be performed in a closed space by suppressing the influence of foreign matter such as dust entering the apparatus from the outside or wind of outside air flowing into the apparatus.

In addition, by the upper air supply fan 234 of the movable portion 230 and the upper exhaust fan 240, cooling air efficiently flows to the thermally expandable sheet 100 after the expansion process. As a result, deformation of the thermally expandable sheet 100 due to heat is suppressed even in a closed space filled with heat. By sandwiching four sides of the thermally expandable sheet 100 on the tray 251, deformation of the thermally expandable sheet 100 is further suppressed.

Further, according to the present embodiment, steam including ink generated by foaming heating can be effectively discharged from the far side of the housing 210.

Further, according to the present embodiment, it is possible to obtain an expansion device capable of using a plurality of types (A3 size/A4 size in the example of the embodiment) of the thermally expandable sheet while having a relatively simple configuration.

In addition, according to the configuration of the conveyance drive unit 270, by changing the rotation speed of the ball screw 271, that is, the moving speed of the movable portion 230, it is possible to effectively dry color ink while utilizing the characteristics of a halogen lamp whose temperature rises in a short time and suppressing foaming at higher speed than in the foaming process.

(Variation)

Although the embodiment of the present invention has been described above, the above-described embodiment is merely an example, and the application range of the present invention is not limited thereto. That is, the embodiment of the present invention can be applied in various ways, and various embodiments fall within the scope of the present invention.

For example, in the above embodiment, the cover 231, the lamp 232, the reflector 233, and the upper air supply fan 234 of the movable portion 230 are disposed so as to face vertically the thermally expandable sheet 100. In addition, to efficiently flow the cooling air to the upper exhaust fan 240, part or all of the above components of the movable portion 230 may be inclined toward the upper exhaust fan 240.

A guide may be provided for inclining the flow of air from the upper air supply fan 234 toward the upper exhaust fan 240, for example, in the lower portion of the cover 231 of the movable portion 230. That is, the guide air may efficiently flow the cooling air to the upper exhaust fan 240. For example, a guide plate may be disposed on the illustrated cover 231, and the lower side of the cover 231 may be bent toward the upper exhaust fan 240 to form a guide.

In the above-described embodiment, foaming heating, drying heating, and cooling associated therewith are performed. In addition, the inside of the apparatus may be ventilated by operating the upper air supply fan 234 and the upper exhaust fan 240 without moving the movable portion 230 and turning on the lamp 232.

Further, in the above embodiment, the upper air supply fan 234 is housed in the cover 231 and moved together. In addition, a structure in which the upper air supply fan fixed to the housing 210 is provided to ventilate the inside of the cover 231 may be used.

Further, in the above-described embodiment, the terminal device 30, the printing device 40, and the expansion device 50 are independent devices. However, in the present invention, at least two of the terminal device 30, the printing device 40, and the expansion device 50 may be integrated.

Further, the printing method of the printing device 40 is not limited to an ink jet method. For example, the printing device 40 is a laser-type printer, and an image may be printed with a toner and a developer. In addition, the light-to-heat conversion layers 104 and 106 may be formed of a material other than black ink containing carbon black as long as the material can easily convert light into heat. In this case, the light-to-heat conversion layers 104 and 106 may be formed by a unit other than the printing device 40.

Further, in the above-described embodiment, the control unit 31 of the expansion device 50 includes a CPU and, by the function of the CPU, performs a drying process for drying the thermally expandable sheet 100, a ventilation process for ventilating the inside of the expansion device 50, an expansion process for expanding the thermally expandable sheet 100, and a cooling process for cooling the inside of the expansion device 50. However, in the expansion device 50 according to the present invention, the control unit 31 may include dedicated hardware such as an application specific integrated circuit (ASIC), a field-programmable gate array (FPGA), or various control circuits, instead of a CPU, and the dedicated hardware may perform each of the drying process, the ventilation process, the expansion process, and the cooling process. In this case, each process may be performed by individual hardware, or all the processes may be performed by single hardware. In addition, some of the processes may be performed by dedicated hardware, and others may be performed by software or firmware.

Note that, in addition to providing the expansion device with the configuration for realizing the functions according to the present invention, each functional configuration by the expansion device 50 exemplified in the above-described embodiments can be realized in a computer controlling the expansion device by applying a program. That is, a program for realizing each functional configuration by the expansion device 50 exemplified in the above embodiments can be applied such that a CPU or the like for controlling an existing information processing device or the like can execute the program.

A method of applying such a program is arbitrary. The program can be stored in a computer readable recording medium such as a flexible disc, a compact disc (CD)-ROM, a digital versatile disc (DVD)-ROM, or a memory card. Furthermore, the program may be superimposed on a carrier wave and applied via a communication medium such as the Internet. For example, a program may be distributed by posing on a bulletin board (BBS: Bulletin Board System) on a communication network. Then, the above-described processes may be performed by starting up this program and executing it under the control of an operating system (OS) as with other application programs.

The preferable embodiments according to the present invention have been described above. However, the present invention is not limited to the specific embodiment, and the invention described in Claims and a scope equivalent thereto are included in the present invention. Hereinafter, the invention described in initial Claims of the application will be appended.

What is claimed is:

1. An expansion device, comprising:
an irradiation unit configured to irradiate a thermally expandable sheet placed on a placing unit with light;
a conveyance unit configured to reciprocably convey the irradiation unit between a first position and a second position;
an exhaust fan fixed to a housing and configured to discharge air from the housing; and
an air supply fan which is movable with the irradiation unit and configured to supply outside air into the housing,
wherein the exhaust fan is provided at a position where air can be discharged from an area of the second position when the irradiation unit is returned from the first position to the second position after being moved from the second position toward the first position.

2. The expansion device according to claim 1, further comprising a cover surrounding the irradiation unit and the air supply fan and configured to pass outside air supplied to the irradiation unit by the air supply fan through to the exhaust fan.

3. The expansion device according to claim 1, wherein the irradiation unit turns on when being moved from the second position toward the first position, and the irradiation unit turns off when being returned from the first position to the second position.

4. The expansion device according to claim 3, wherein the air supply fan stops when being moved from the second position toward the first position and starts when being returned from the first position to the second position.

5. The expansion device according to claim 1, wherein:
the housing has, at one side thereof, an opening for a user to insert and remove the thermally expandable sheet, and
the exhaust fan is adjacent to a surface of the housing that is adjacent to the second position and farthest from the opening.

6. The expansion device according to claim 5, further comprising:
an opening/closing door provided in the opening,
wherein the opening and the opening/closing door are provided at a side of the housing adjacent to the first position and opposed to the second position.

7. The expansion device according to claim 5, wherein the second position is a home position of the irradiation unit and is at an end portion of the housing.

8. The expansion device according to claim 1, wherein:
the irradiation unit includes a halogen lamp and a reflector surrounding a part of the halogen lamp to reflect light of the halogen lamp, and
the air supply fan is positioned above the halogen lamp to supply outside air toward the halogen lamp.

9. The expansion device according to claim 8, wherein the exhaust fan is positioned at the second position which is at an end portion in the housing.

10. The expansion device according to claim 1, wherein an upper intake unit, which is an opening for sucking outside air, is provided at an upper surface of the housing.

11. The expansion device according to claim 1, wherein the placing unit includes a removable tray for sandwiching the thermally expandable sheet so as to expose a portion of the thermally expandable sheet to be irradiated with light.

12. The expansion device according to claim 2, wherein one or more exhaust fans and one or more air supply fans are provided.

13. The expansion device according to claim 1, wherein the irradiation unit and the conveyance unit are provided in the housing.

14. An expansion device, comprising:
an irradiation unit configured to irradiate a thermally expandable sheet placed on a placing unit with an electromagnetic wave;
a conveyance unit configured to reciprocably convey the irradiation unit between a first position and a second position;
an exhaust fan fixed to a housing and configured to discharge air from the housing; and
an air supply fan movable together with the irradiation unit and configured to supply outside air into the housing,
wherein the housings includes, at a side thereof adjacent to the first position, an opening for a user to insert and remove the thermally expandable sheet, and
wherein the exhaust fan is provided at a side of the housing adjacent to the second position.

15. The expansion device according to claim 14, wherein:
the irradiation unit includes a halogen lamp and a reflector surrounding a part of the halogen lamp to reflect light of the halogen lamp, and
the air supply fan is positioned above the halogen lamp to supply outside air toward the halogen lamp.

16. The expansion device according to claim 14, wherein the exhaust fan is provided on a surface in the housing farthest from the opening.

17. A molding system comprises:
a printing device configured to print an image by using a predetermined ink on a thermally expandable sheet provided with a thermally expandable layer on one surface side; and
an expansion device configured to expand the thermally expandable layer by irradiating the thermally expandable sheet with light,
wherein the expansion device comprises:
an irradiation unit configured to irradiate the thermally expandable sheet placed on a placing unit with light;
a conveyance unit configured to reciprocably convey the irradiation unit between a first position and a second position;
an exhaust fan fixed to a housing and configured to discharge air from the housing; and
an air supply fan movable together with the irradiation unit and configured to supply outside air into the housing, and
wherein the housing includes an opening for a user to insert and remove the thermally expandable sheet at a side of the housing adjacent to the first position, and the exhaust fan is provided at a side of the housing adjacent to the second position.

18. The molding system according to claim 17, wherein the exhaust fan is provided on a surface in the housing farthest from the opening.

19. The molding system according to claim 17, wherein:

the irradiation unit comprises a halogen lamp and a reflector surrounding a part of the halogen lamp to reflect the light of the halogen lamp, the air supply fan of the expansion device is positioned above the halogen lamp to supply outside air toward the halogen lamp, and an upper intake unit, which is an opening for sucking outside air, is provided at an upper surface of the housing.

* * * * *